United States Patent
Lee et al.

(10) Patent No.: US 12,079,120 B2
(45) Date of Patent: *Sep. 3, 2024

(54) STORAGE DEVICE STORING DATA BASED ON KEY-VALUE AND OPERATING METHOD OF THE SAME

(71) Applicant: SAMSUNG ELECTRONICS CO., LTD., Suwon-si (KR)

(72) Inventors: Hwang Lee, Seoul (KR); Satish Kumar, Suwon-si (KR); Chansoo Kim, Seoul (KR); Wan Heo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 18 days.

This patent is subject to a terminal disclaimer.

(21) Appl. No.: 18/092,982

(22) Filed: Jan. 4, 2023

(65) Prior Publication Data

US 2023/0143869 A1 May 11, 2023

Related U.S. Application Data

(63) Continuation of application No. 17/034,242, filed on Sep. 28, 2020, now Pat. No. 11,573,890.

(30) Foreign Application Priority Data

Dec. 24, 2019 (KR) .......................... 10-2019-0174281

(51) Int. Cl.
*G06F 12/02* (2006.01)
*G06F 12/14* (2006.01)
*G06F 13/16* (2006.01)
*G06F 21/79* (2013.01)
*G06F 21/10* (2013.01)

(52) U.S. Cl.
CPC ...... *G06F 12/0238* (2013.01); *G06F 12/0253* (2013.01); *G06F 12/1466* (2013.01); *G06F 13/1668* (2013.01); *G06F 21/79* (2013.01); *G06F 21/107* (2023.08)

(58) Field of Classification Search
None
See application file for complete search history.

(56) References Cited

U.S. PATENT DOCUMENTS

| | | | |
|---|---|---|---|
| 7,689,616 B2 ‡ | 3/2010 | Peterson | G06F 16/24556 707/737 |
| 9,311,252 B2 ‡ | 4/2016 | Fong | G06F 12/12 |
| 9,785,547 B2 ‡ | 10/2017 | Takabatake | G06F 12/0246 |
| 9,971,526 B1 ‡ | 5/2018 | Wei | G06F 3/064 |
| 10,248,680 B2 ‡ | 4/2019 | Fang | G06F 16/23 |
| 10,318,199 B2 ‡ | 6/2019 | Hack | G06F 3/0608 |

(Continued)

*Primary Examiner* — Charles J Choi
(74) *Attorney, Agent, or Firm* — Fish & Richardson P.C.

(57) ABSTRACT

A storage device generates and stores a key stream and a value stream by extracting from data a plurality of keys and a plurality of values respectively corresponding to the plurality of keys. The storage device includes a controller and a non-volatile memory. The controller receives from a host information about an invalid key included in the key stream together with a compaction command, and performs a compaction operation on the key stream in response to the compaction command. The non-volatile memory stores the key stream and the value stream. The controller merges the key stream with another key stream based on the information about the invalid key in the compaction operation.

20 Claims, 22 Drawing Sheets

(56) References Cited

U.S. PATENT DOCUMENTS

2013/0275656 A1‡ 10/2013 Talagala .............. G06F 12/0246
                                                            711/103
2018/0150472 A1‡ 5/2018 Chen ..................... G06F 16/282
2019/0012336 A1‡ 1/2019 Schreter ................ H04L 67/562
2019/0034466 A1‡ 1/2019 Kim ...................... G06F 16/113

‡ imported from a related application

MMT

| ADDR | Idx | VD1 | VD2 | VD3 |
|------|-----|-----|-----|-----|
| PPN1 | 1 | 1 | 0 | 1 |
| PPN2 | 2 | 1 | 1 | 1 |
| PPN3 | 3 | 0 | 0 | 0 |
| PPN4 | 4 | 1 | 1 | 0 |

STORAGE DEVICE STORING DATA BASED ON KEY-VALUE AND OPERATING METHOD OF THE SAME

CROSS-REFERENCE TO RELATED APPLICATION

This is a Continuation of U.S. application Ser. No. 17/034,242, filed Sep. 28, 2020, and a claim of priority is made to Korean Patent Application No. 10-2019-0174281, filed on Dec. 24, 2019 in the Korean Intellectual Property Office, the disclosure of which is incorporated herein in its entirety by reference.

BACKGROUND

1. Technical Field

The inventive concept(s) described herein relate to a storage device and an operating method of the same. More particularly, the inventive concept(s) described herein relate to a storage device that stores data based on key-value, and an operating method of the same.

2. Description of the Related Art

Recently, various types of electronic devices have been developed for use. Some electronic devices are capable of storing data and operating based on the stored data. To this end, an electronic device may include a storage device or a storage system to store data. An electronic device may also or alternatively read data or otherwise operate while communicating with an external storage device or storage system.

Storage devices may be classified in various ways. As an example of classifications for storage devices, a storage device may be classified as a non-volatile memory-based storage or a volatile memory-based storage. A non-volatile memory-based storage may not lose data even when power is not supplied. On the other hand, when a power supply is interrupted, data stored in the volatile memory-based storage may be lost, but the volatile memory-based storage may otherwise operate faster than the non-volatile memory-based storage.

As another example of classifications for memory, a storage device may be classified as a block storage, a file storage, or an object storage. The block storage manages data based on physical locations, and the file storage manages data based on logical sequences. On the other hand, the object storage may manage data based on a unique identifier. The block storage and the file storage are useful when the amount of text data is large, while the object storage is an efficient alternative when the amount of atypical data such as sound data and video data is large. An example of the object storage is a key-value storage that stores data on a key-value basis.

SUMMARY

The inventive concept(s) described herein include a storage device that performs a compaction operation on a key stream based on information about an invalid key, and a storage system that includes the storage device.

According to an aspect of inventive concept(s) described herein, a storage device includes a controller and a non-volatile memory. The storage device generates and stores a key stream and a value stream by extracting from data a plurality of keys and a plurality of values respectively corresponding to the plurality of keys. The controller receives from a host information about an invalid key included in the key stream together with a compaction command, and performs a compaction operation on the key stream in response to the compaction command. The non-volatile memory stores the key stream and the value stream. The controller merges the key stream with another key stream based on the information about the invalid key in the compaction operation.

According to another aspect of inventive concept(s) described herein, a storage device stores a key stream and a value stream generated by extracting from data a plurality of keys and a plurality of values respectively corresponding to the plurality of keys. An operating method of the storage device includes: receiving from a host a compaction command and information about an invalid key included in the key stream; performing the compaction operation by merging the key stream with another key stream based on the information about the invalid key; and storing the merged key stream in a non-volatile memory.

According to another aspect of inventive concept(s) described herein, a storage system stores a key stream and a value stream that have been generated by extracting from data a plurality of keys and a plurality of values respectively corresponding to the plurality of keys. The storage system includes a host and a storage device. The host is configured to transmit a compaction command for the key stream and information about an invalid key included in the key stream. The storage device is configured to receive the compaction command, perform the compaction operation by merging the key stream with another key stream based on the information about the invalid key, and store the merged key stream.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Figure 1:
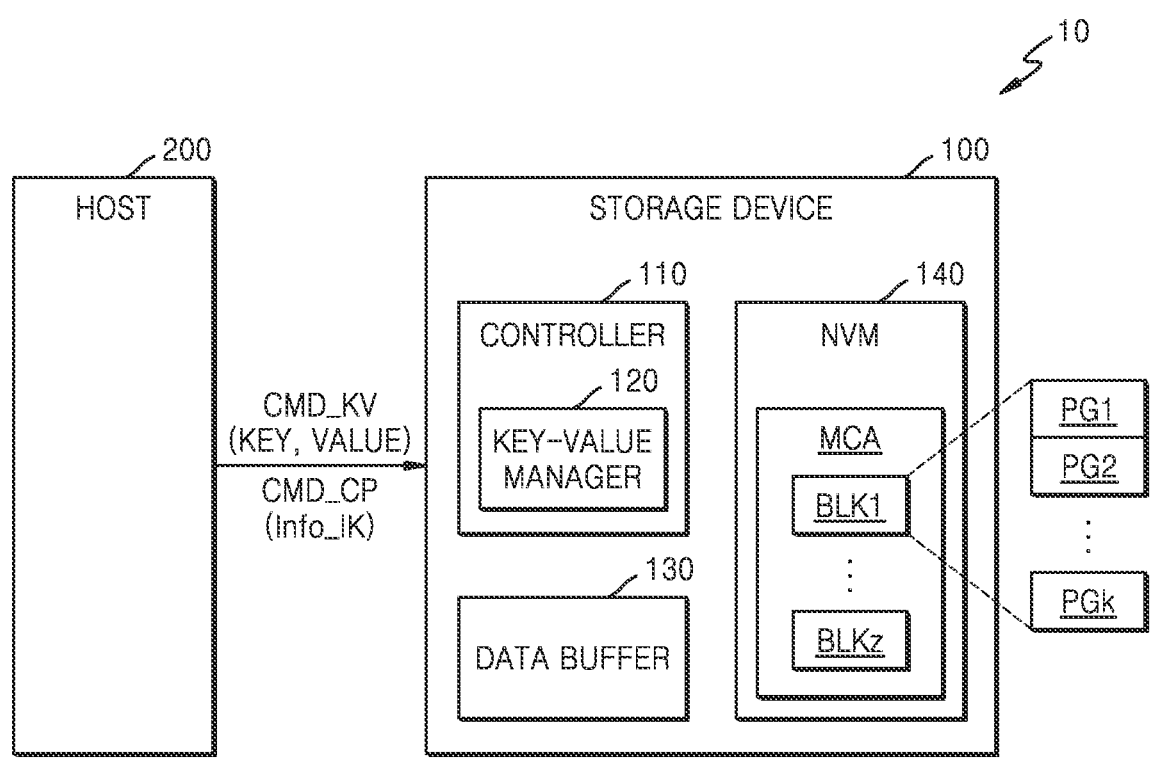
FIG. 1 is a block diagram illustrating a storage system according to an embodiment.

FIG. 1 is a block diagram illustrating a storage system 10 according to an embodiment.

Referring to FIG. 1, the storage system 10 may include a storage device 100 and a host 200, and the storage device 100 may include a controller 110, data buffer 130, and a NVM 140 (non-volatile memory). The host 200 may communicate with the storage device 100 via various interfaces. For example, the host 200 may be implemented as, by or using an application processor (AP) or a system-on-a-chip (SoC). The controller 110 may include a memory that stores instructions and a processor that executes the instructions to implement some or all aspects of processes implemented by or using the controller 110.

In some embodiments described herein, the storage device 100 may be an object storage including a key-value storage device or a key-value store, for example, a key-value solid state drive (SSD). Key-value storage devices are devices that process data quickly and simply by using key-value pairs. In this case, the "key-value pair" may be a pair of a unique key and a value that is data corresponding to the key and may be referred to as a "tuple" or a "key-value tuple". The unique key may uniquely identify, or otherwise correspond to, the value. In addition, the key-value pair may mean a data storage paradigm designed for storage and retrieval management of related arrays, which are data structures called dictionaries and hashes. In the key-value pair, the key may be represented by an arbitrary string, such as a file name, a uniform resource identifier (URI), field, or hash, and the value may be any kind of data, such as an image, a user preferred file, and a document. In this case, sizes of the key and the value may vary. For example, the size of the value may vary according to data included in the value. As used herein, the term "key-value pair" may refer to a single pair of a key KEY and a value VALUE, or each of multiple pairs of keys KEY and values VALUE.

Hereinafter, descriptions of the storage device 100 primarily include embodiments in which the storage device 100 is a key-value storage device. In these embodiments, the storage device 100 may be substantially synonymous with the key-value storage device or the key-value store. However, the storage device 100 is not limited to the key-value storage device or the key-value store. The storage device 100 may be or include an arbitrary object cache system or an arbitrary object storage system, which manages data in object units. Accordingly, the storage device 100 may manage the data in object units by using methods other than the key-value pair.

The host 200 may transmit a key-value command CMD_KV for writing data including a key KEY-value VALUE pair, for example, a write request command or a put command, to the storage device 100. The key-value pair included in the key-value command CMD_KV may include a plurality of keys KEY and a plurality of values VALUE corresponding to the plurality of keys KEY. The storage device 100 may write the value VALUE to the NVM 140 in response to the key-value command CMD_KV. In an embodiment, the host 200 may transmit the key-value command CMD_KV including the key KEY, for example, a read request command or a get command, to the storage device 100. The storage device 100 may read the value VALUE corresponding to the key KEY from the NVM 140 in response to the key-value command CMD_KV.

The host 200 may transmit a compaction command CMP_CP for performing a compaction operation on the key-value pair to the storage device 100. The storage device 100 may perform the compaction operation on a plurality of keys KEY stored in the NVM 140 in response to the compaction command CMP_CP. In the present specification, the compaction operation may refer to an operation of generating a key stream by using only valid keys KEY and not one or more of the invalid keys KEY, among the plurality of keys KEY stored in the NVM 140. The compaction operation may result in generating a key stream with fewer overall keys KEY than otherwise, by excluding invalid keys KEY among the plurality of keys KEY stored in the NVM 140 from being included in the generated key stream.

According to an aspect of inventive concept(s) described herein, the host 200 may transmit information about an invalid key Info_IK together with the compaction command CMP_CP to the storage device 100. The storage device 100 may perform the compaction operation based on the information about the invalid key Info_IK.

The controller 110 may write the value VALUE to the NVM 140 in response to a write request from the host 200. Alternatively, the controller 110 may control the NVM 140 such that the value VALUE stored in the NVM 140 is read in response to a read request from the host 200.

The controller 110 may include a key-value manager 120. The key-value manager 120 may receive the key-value pair included in the key-value command CMD_KV and separate the key KEY and the value VALUE from the key-value pair. The key-value pair included in the key-value command CMD_KV may include a plurality of keys KEY and a plurality of values VALUE corresponding to the plurality of keys KEY. The key-value manager 120 may extract the plurality of keys KEY included in the key-value pair and store the plurality of keys KEY in the data buffer 130. The key-value manager 120 may extract a plurality of values VALUE included in the key-value pair and store the plurality of values VALUE in the data buffer 130.

When the plurality of keys KEY of a certain number of data such as a predetermined threshold number of data or a certain amount of data such as a predetermined threshold amount of data are stored in the data buffer 130, the key-value manager 120 may store the stored plurality of keys KEY as a key stream in the NVM 140. When the plurality of values VALUE of a certain number of data such as a predetermined threshold number of data or a certain amount of data such as a predetermined threshold amount of data are stored in the data buffer 130, the key-value manager 120 may store the stored plurality of values VALUE as a value stream. In an embodiment, each of the value stream and the key stream may be stored in different areas from each other in the NVM 140.

In addition, the key-value manager 120 may read a plurality of key streams from the NVM 140 in response to the compaction command CMP_CP, delete one or more of the invalid keys KEY among the plurality of key streams, and perform the compaction operation for generating a new key stream by using valid keys KEY. According to an embodiment, the key-value manager 120 may determine which key KEY among the plurality of key streams is valid based on the information about the invalid key Info_IK received from the host 200. The key-value manager 120 may generate a new key stream by merging only valid keys KEY among the plurality of key streams.

In an embodiment, the information about the invalid key Info_IK may include index information corresponding to the invalid key KEY. In another embodiment, the information about the invalid key Info_IK may include address information in the NVM 140 in which the invalid key KEY is stored.

In the present specification, although an example is illustrated in which the key-value manager 120 receives the information about the invalid key Info_IK from the host 200 and performs the compaction operation by using the received information, this is only one embodiment. In another embodiment, the key-value manager 120 may receive information about the valid keys KEY from the host 200, and perform the compaction operation by using the received information about the valid keys.

The data buffer 130 may include at least one memory element for storing the key KEY and the value VALUE. In an example, the data buffer 130 may include volatile memory elements such as dynamic random access memory (RAM) (DRAM) and static RAM (SRAM).

The NVM 140 may include a memory cell array MCA, and the memory cell array MCA may include memory blocks (BLK1 through BLKz). A first memory block BLK1 may include a plurality of pages (PG1 through PGk). In this case, z and k may each be a positive integer and may be variously changed according to an embodiment. For example, a memory block may be a unit of erase, and a page may be a unit of write and read. In some embodiments, the memory cell array MCA may include a plurality of planes, a plurality of dies, or a plurality of chips. In an embodiment, the NVM 140 may include a flash memory device, for example, a NAND flash memory device. However, inventive concept(s) described herein are not limited thereto, and the NVM 140 may include a resistive memory device such as resistive RAM (rRAM), phase change RAM (PRAM), and magnetic RAM (MRAM).

In an embodiment, the key stream generated by using the key KEY and the value stream generated by using the value VALUE may be stored in different memory blocks (BLK1 through BLKz), or in different pages (PG1 through PGk) of one same memory block, for example, a first block BLK1.

The storage system 10 may be implemented as, by, using or in, for example, a personal computer (PC), a data server, a network-coupled storage, an internet of things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like.

In some embodiments, the storage device 100 may include or be an internal memory embedded in an electronic device. For example, the storage device 100 may include or be an embedded universal flash storage (UFS) memory device or an embedded multi-media card (eMMC). In some embodiments, the storage device 100 may include or be an external memory removable from the electronic device. For example, the storage device 100 may include or be a UFS memory card, a compact flash (CF) memory card, a secure digital (SD) card, a micro-SD card, a mini SD card, an extreme digital (xD) card, or a memory stick.

Figure 2:
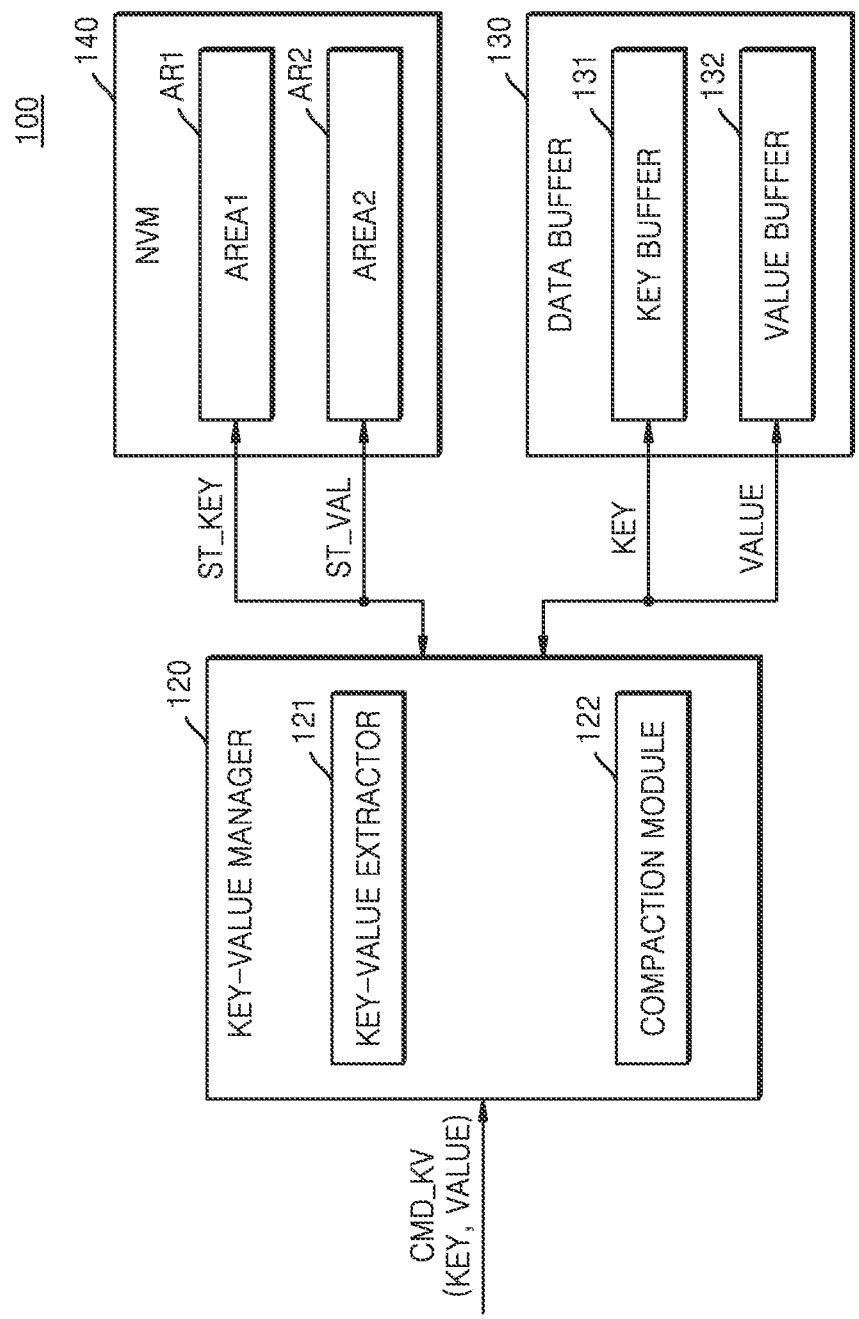
FIG. 2 is a block diagram illustrating a storage device according to an embodiment.

FIG. 2 is a block diagram illustrating the storage device 100 according to an embodiment. FIG. 2 illustrates an operation method in the case when the storage device 100 receives a key-value command CMD_KV for storing the key KEY and the value VALUE.

Referring to FIG. 2, the storage device 100 may include the key-value manager 120, the data buffer 130, and the NVM 140. The key-value manager 120 may include a key-value extractor 121 and a compaction module 122. The key-value extractor 121 and the compaction module 122 may be implemented, for example, using separate software algorithms executed by a processor such as a microprocessor. The key-value extractor 121 may extract the key KEY and the value VALUE included in the key-value command CMD_KV. The key-value extractor 121 may store the extracted key KEY in a key buffer 131 of the data buffer 130 and store the extracted value VALUE in a value buffer 132 of the data buffer 130. In an embodiment, the key buffer 131 and the value buffer 132 may be configured with separate memory elements such as physically separate memory elements. In another embodiment, the key buffer 131 and the value buffer 132 may be configured as different areas in the data buffer 130 such as physically separated areas.

In an embodiment, the key-value extractor 121 may manage a physical address of the key KEY stored in the key buffer 131 by using a mapping table. For example, the mapping table may be generated as a hash table that stores a hash key corresponding to the key KEY as a mapping index for the key KEY.

When the amount of keys KEY stored in the key buffer 131 is equal to or greater than a certain amount of data such as a predetermined threshold amount of data, the key-value extractor 121 may generate a key stream ST_KEY based on the plurality of keys KEY. In an embodiment, the key-value extractor 121 may generate the key stream ST_KEY by sequentially arranging the plurality of keys KEY. In another embodiment, the key-value extractor 121 may generate the key stream ST_KEY by combining the plurality of keys KEY with indices for the values VALUE that respectively correspond to the plurality of keys KEY. That is, in the latter embodiment, for each key-value pair, each key KEY may be combined with an index corresponding to the value VALUE, such that collectively the plurality of keys KEY are combined with indices corresponding to the values VALUE to generate the key stream ST_KEY. The key-value extractor 121 may store the generated key stream ST_KEY in a first area AR1 of the NVM 140.

In an embodiment, the key-value extractor 121 may manage the physical addresses of the first area AR1 of the stored key stream ST_KEY by using a key table. In an embodiment, the key table may be generated as a hash table that stores a hashed key corresponding to each key KEY of the key stream ST_KEY as a mapping index for the key KEY.

When the amount of values VALUE stored in the value buffer 132 is equal to or greater than a certain amount of data such as a predetermined threshold amount of data, the key-value extractor 121 may generate a value stream ST_VAL based on the plurality of values VALUE. For example, the key-value extractor 121 may generate the value stream ST_VAL by sequentially arranging the plurality of values VALUE. The key-value extractor 121 may store the generated value stream ST_VAL in a second area AR2 of the NVM 140. In an embodiment, the key-value extractor 121 may manage the physical addresses of the second area AR2 of the stored value stream ST_VALUE by using a value table.

Figure 3:
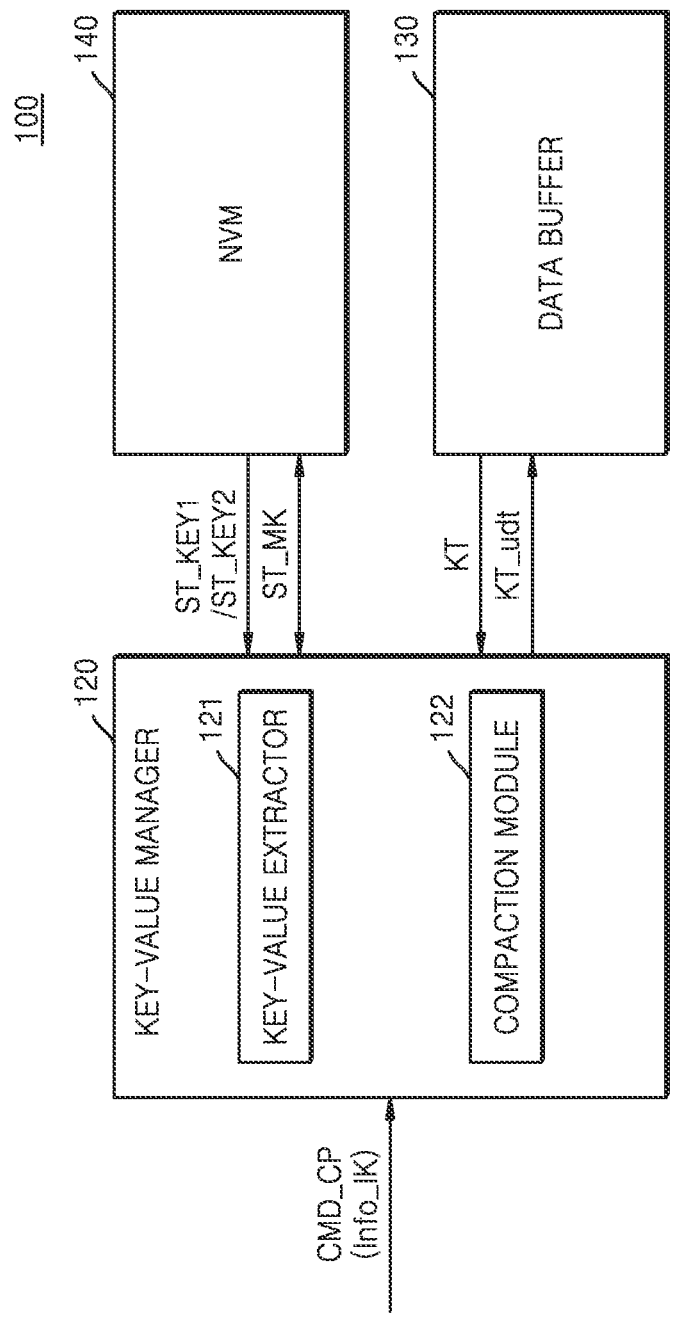
FIG. 3 is a block diagram illustrating a storage device according to an embodiment.

FIG. 3 is a block diagram illustrating a storage device according to an embodiment. FIG. 3 illustrates an operation method in the case when the storage device 100 receives a compaction command CMD_CP for the compaction operation. Descriptions previously given with reference to FIG. 2 are omitted.

Referring to FIG. 3, the storage device 100 may include the key-value manager 120, the data buffer 130, and the NVM 140. The key-value manager 120 may include the key-value extractor 121 and the compaction module 122.

The compaction module 122 may perform the compaction operation on a plurality of key streams including a first key stream ST_KEY1 and a second key stream ST_KEY2 stored in the NVM 140 in response to the compaction command CMD_CP. For example, the compaction operation may mean an operation of compressing data in a long structured merge (LSM) tree-based data structure. The invalid key KEY may be deleted from the keys KEY in the first key stream ST_KEY1 and the second key stream ST_KEY2 read from the NVM 140 in the compaction operation.

The compaction module 122 may read the first key stream ST_KEY1 and the second key stream ST_KEY2 from the NVM 140 and may determine an invalid key KEY among the first key stream ST_KEY1 and the second key stream ST_KEY2 based on the information about the invalid key Info_IK received together with the compaction command CMD_CP. In an example, the invalid key KEY may include a key KEY corresponding to a value VALUE that has received a delete command from the host 200. In some embodiments, the information about the invalid key Info_IK may include multiple notifications of invalid keys KEY, so that multiple of the invalid keys KEY are removed from the first key stream ST_KEY1 and the second key stream ST_KEY2 read from the NVM 140 based on the information about the invalid key Info_IK.

The compaction module 122 may generate a merged key stream ST_MK by merging only valid keys KEY included in the first key stream ST_KEY1 and the second key stream ST_KEY2. The compaction module 122 may write the merged key stream ST_MK in the NVM 140.

When performing the compaction operation, the storage device 100 may perform the compaction operation by reading only the first key stream ST_KEY1 and the second key stream ST_KEY2 without reading the values VALUE having a relatively large amount of data. Accordingly, the amount of data access to the NVM 140 may be reduced. In addition, according to an embodiment of the present disclosure, the storage device 100 may reduce time and operation memory required for the compaction operation by performing the compaction operation based on the information about the invalid key Info_IK received from the host 200 without a need for analyzing one or more tables (for example, the key table KT or a value table) that is stored in the data buffer 130.

The compaction module 122 may update validity of the invalid key KEY that is a target of the compaction operation. In an embodiment, the compaction module 122 may read the key table KT including information about the invalid key KEY from the data buffer 130 and may update the key table KT based on the information about the invalid key Info_IK. The compaction module 122 may store the updated key table KT_udt in the data buffer 130. The invalid key KEY may be omitted from the updated key table KT_udt in the data buffer 130 based on the compaction operation. In some embodiments, multiple of the invalid keys KEY may be deleted from the key table KT for one or more compaction operations based on one or more instances of the information about the invalid key Info_IK.

Figure 4:
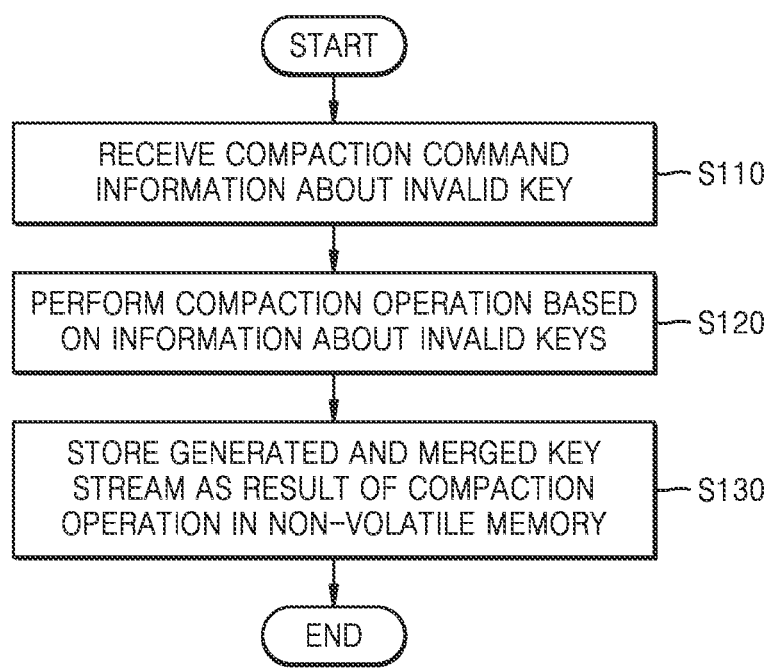
FIG. 4 is a flowchart illustrating an operating method of a storage device, according to an embodiment.

FIG. 4 is a flowchart illustrating an operating method of a storage device, according to an embodiment;

Referring to FIGS. 3 and 4, the storage device 100 may receive the compaction command CMD_CP and the information about the invalid key Info_IK (S110). The storage device 100 may perform the compaction operation based on the received information about the invalid key Info_IK (S120). In an embodiment, the storage device 100 may determine multiple of the invalid keys KEY based on the information about the invalid key KEY among the plurality of keys KEY included in the first key stream ST_KEY1 and the second key stream ST_KEY2 that are stored in the NVM 140. The storage device 100 may generate the merged key stream ST_MK by merging only valid keys KEY from the first key stream ST_KEY1 and the second key stream ST_KEY2 and excluding one or move invalid keys KEY based on the information about the invalid key Info_IK.

The storage device 100 may store the merged key stream ST_MK generated by the compaction operation in the NVM 140 (S130). In an embodiment, the storage device 100 may delete the first key stream ST_KEY1 and the second key stream ST_KEY2, which are the targets of the compaction operation, from the NVM 140 after storing the merged key stream ST_MK. The merged key stream ST_MK may include valid keys KEY and not one or more invalid keys KEY that are omitted based on one or more compaction operations. The merged key stream ST_MK may include data that is updated or corrected to reflect the information about the invalid key Info_IK, as compared to data of the first key stream ST_KEY1 and the second key stream ST_KEY1.

Figure 5:
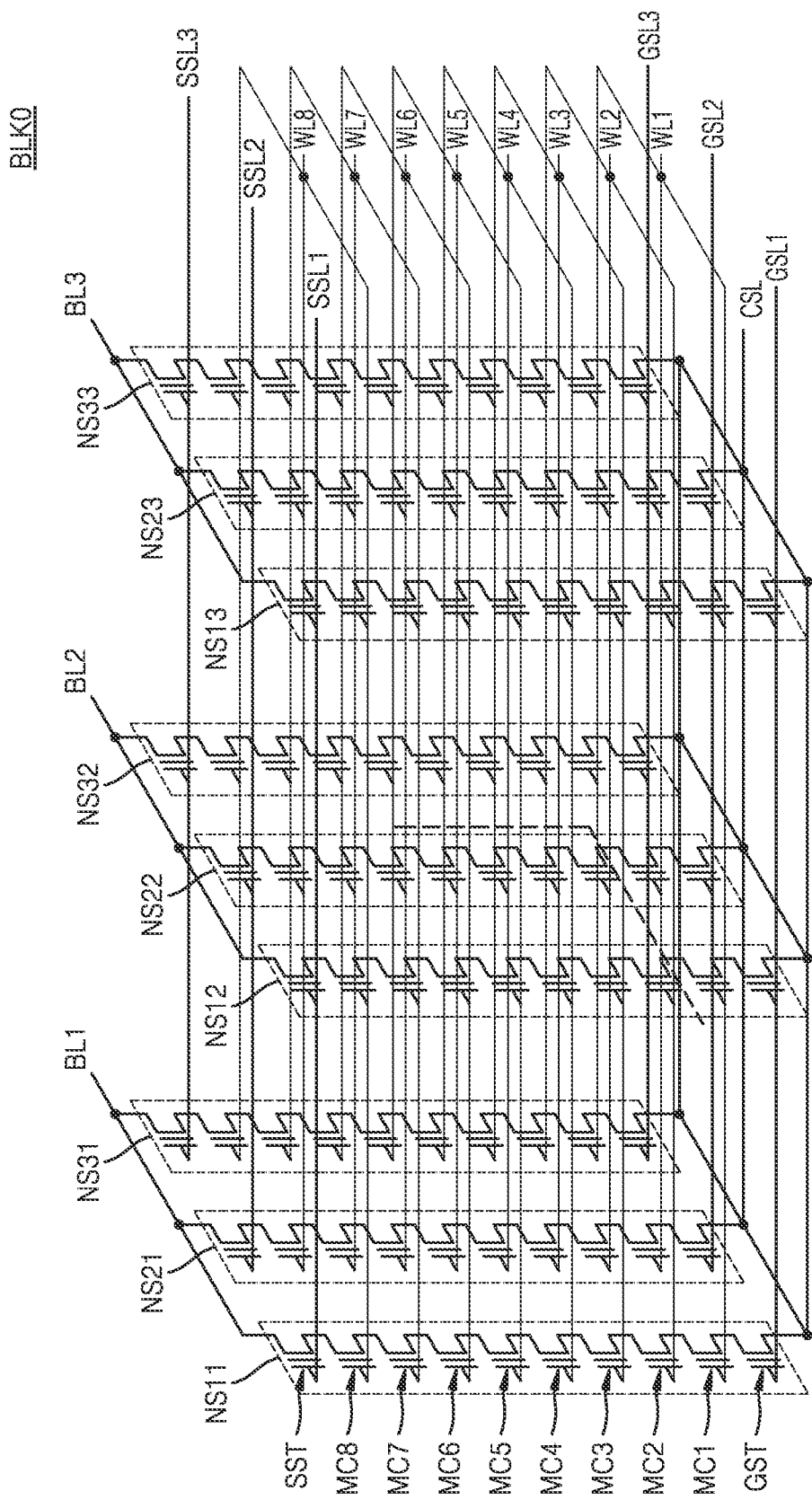
FIG. 5 is a circuit diagram illustrating a memory block included in a memory cell array, according to an embodiment.

FIG. 5 is a circuit diagram illustrating a memory block included in a memory cell array, according to an embodiment;

Referring to FIG. 5, a memory cell array (for example, MCA in FIG. 1) may be a memory cell array of vertical NAND flash memories. The memory cell array may include a plurality of memory blocks. Each memory block BLK0 may include a plurality of NAND cell strings (NS11 through NS33), a plurality of word lines (WL1 through WL8), a plurality of bit lines (BL1 through BL3), a plurality of ground selection lines (GSL1 through GSL3), a plurality of cell string selection lines (SSL1 through SSL3), and a common source line CSL. In this case, the number of NAND cell strings, the number of word lines WL, the number of bit lines BL, the number of ground select lines GSL, and the number of cell string select lines SSL may vary according to an embodiment.

The NAND cell strings (NS11, NS21, and NS31) may be between the first bit line BL1 and the common source line CSL. The NAND cell strings (NS12, NS22, and NS32) may be between the second bit line BL2 and the common source line CSL. The NAND cell strings (NS13, NS23, and NS33) may be between the third bit line BL3 and the common source line CSL. Each NAND cell string (for example, NS11) may include a cell string selection transistor SST, a plurality of memory cells (MC1 through MC8), and a ground selection transistor GST, which are connected in series.

Cell strings connected in common to one bit line may constitute one column. For example, the cell strings (NS11, NS21, and NS31) commonly connected to the first bit line BL1 may correspond to a first column. The cell strings (NS12, NS22, and NS32) commonly connected to the second bit line BL2 may correspond to a second column. The cell strings (NS13, NS23, and NS33) commonly connected to the third bit line BL3 may correspond to a third column.

The cell strings connected to one cell string selection line may constitute one row. For example, the cell strings (NS11, NS12, and NS13) connected to the first cell string selection line SSL1 may correspond to a first row. The cell strings (NS21, NS22, and NS23) connected to the second cell string selection line SSL2 may correspond to a second row. The cell strings (NS31, NS32, and NS33) connected to the third cell string selection line SSL3 may correspond to a third row.

The cell string selection transistor SST may be connected to the corresponding cell string selection lines (SSL1 through SSL3). The plurality of memory cells (MC1 through MC8) may be connected to the corresponding word lines (WL1 through WL8), respectively. The ground selection transistor GST may be connected to the corresponding ground selection lines (GSL1 through GSL3). The cell string selection transistor SST may be connected to the corresponding bit lines (BL1 through BL3). The ground selection transistor GST may be connected to the common source line CSL.

Word lines on the same level (for example, WL1) may be commonly connected to each other, while the string selection lines (SSL1 through SSL3) are apart from each other and the ground selection lines (GSL1 through GSL3) are apart from each other. For example, when memory cells connected to the first word line WL1 and belonging to the cell strings (NS11, NS12, and NS13) are programmed, the first word line WL1 and the first string selection line SSL1 may be selected. The ground selection lines (GSL1 through GSL3) may be commonly connected to each other.

The storage device 100 according to an embodiment of the present disclosure may store keys KEY and values VALUE in different areas of the memory cell array MCA. In an example, the key KEY may be stored in a first page connected to the first word line WL1 of the memory block BLK0. The value VALUE may be stored in a second page connected to the fourth word line WL4 of the memory block BLK0.

Figure 6:
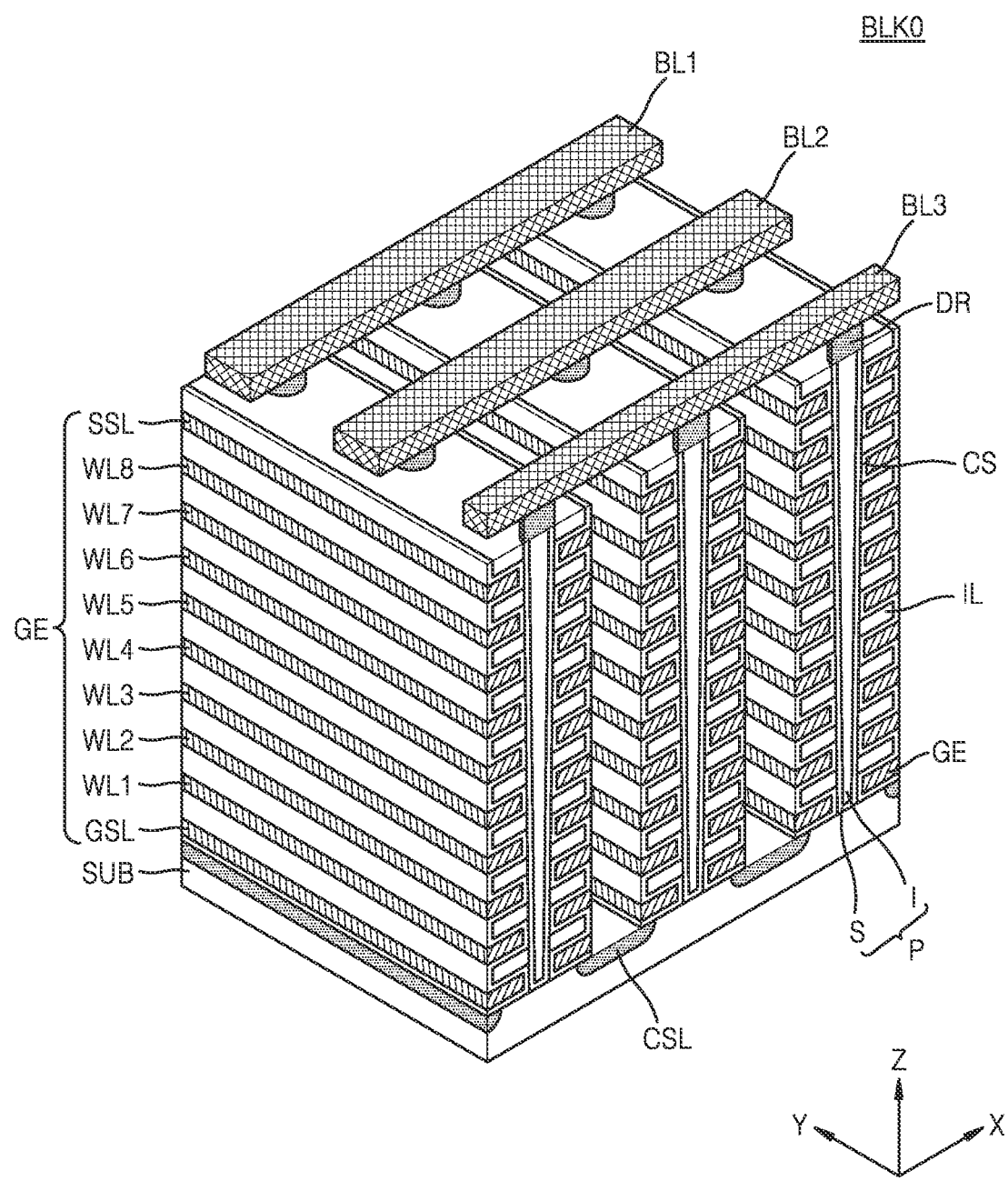
FIG. 6 is a perspective view illustrating a memory block in FIG. 5.

FIG. 6 is a perspective view illustrating the memory block BLK0 in FIG. 5.

Referring to FIG. 6, each memory block included in a memory cell array (for example, MCA in FIG. 1) may be formed in a vertical direction with respect to a substrate SUB. In FIG. 6, the memory block BLK0 is illustrated as including two selection lines (GSL and SSL), eight word lines (WL1 through WL8), and three bit lines (BL1 through BL3), but the numbers thereof may actually be more or less than these numbers.

The substrate SUB may be of a first conductivity type (for example, a p-type). The common source lines CSL extend therein in a first direction (for example, a Y-direction) and may be of a second conductivity type (for example, n-type). A plurality of insulating layers IL may be sequentially arranged in a third direction (for example, a Z-direction). The plurality of insulating layers are arranged in a region of the substrate SUB between two adjacent common source lines CSL in a second direction (for example, an X-direction), and individually extend in the first direction. The plurality of insulating layers IL may be apart from each other by the same distance or by at least a minimum predetermined threshold distance in the third direction. For example, the plurality of insulating layers IL may include an insulating material such as silicon oxide.

A plurality of pillars P may be sequentially arranged in the region of the substrate SUB in the second direction. The plurality of pillars P individually extend in the third direction and are arranged between two adjacent common source lines CSL in the second direction. The plurality of pillars P penetrate through the plurality of insulating films IL in the third direction. For example, the plurality of pillars P may contact the substrate SUB through the plurality of insulating layers IL. A surface layer S of each pillar P may include a silicon material of the first type and may function as a channel region. An inner layer I of each pillar P may include an insulating material such as silicon oxide or an air gap.

A charge storage layer CS may be provided along exposed surfaces of the insulating layers IL, the pillars P and the substrate SUB in the region between two adjacent common source lines CSL. The charge storage layer CS may include a gate insulating layer (which may be alternatively referred to as a tunneling insulating layer), a charge trap layer, and a blocking insulating layer. For example, the charge storage layer CS may have an oxide-nitride-oxide (ONO) structure. In addition, a gate electrode GE may include the selection lines GSL and SSL and the word lines (WL1 through WL8) and may be provided in a region between two adjacent common source lines CSL on an exposed surface of the charge storage layer CS.

Drains or drain contacts DR may be provided on each of the plurality of pillars P. For example, the drains or the drain contacts DR may include a silicon material doped with impurities of the second conductivity type. The bit lines (BL1 through BL3), which extend in the second direction, may be provided on the drains DR. The bit lines (BL1 through BL3) are apart from each other by the same distance or at least a minimum predetermined threshold distance in the first direction.

Figure 7:
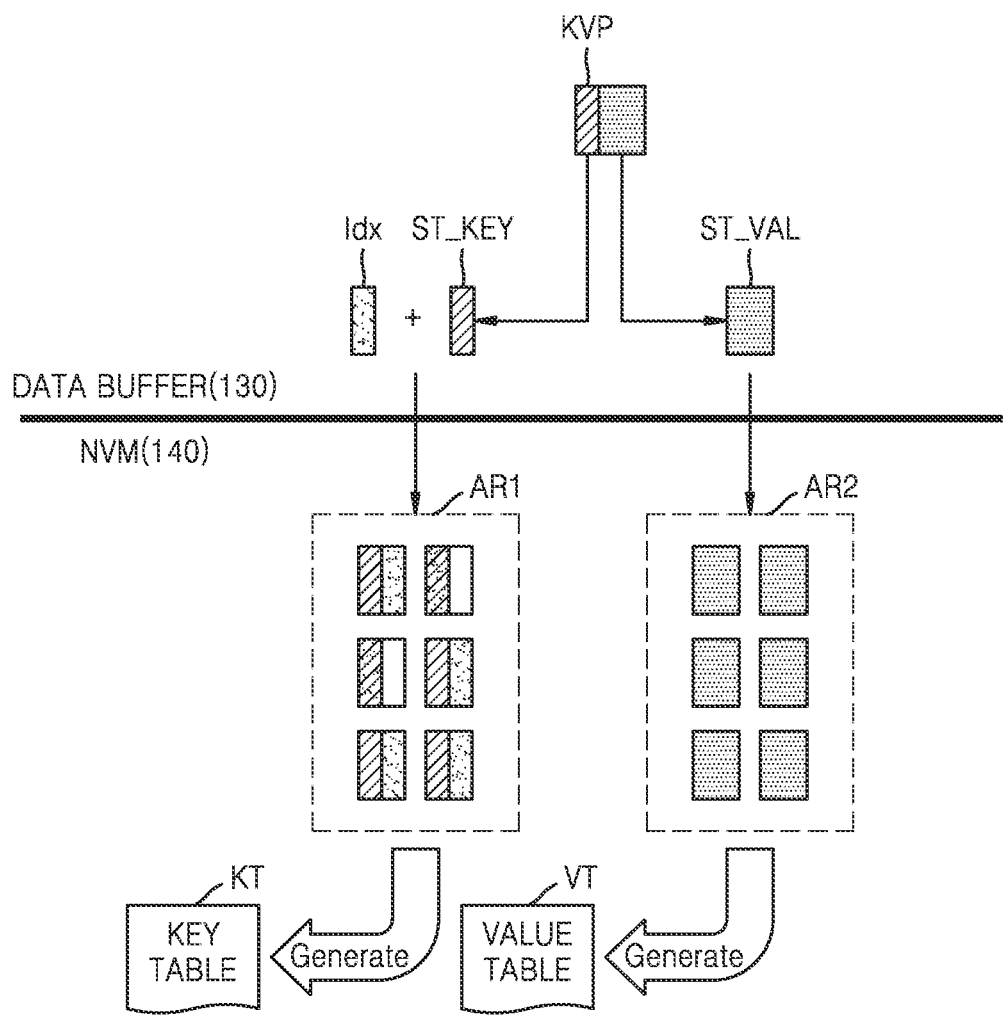
FIG. 7 is a conceptual diagram illustrating an operation of a key-value manager, according to an embodiment.

FIG. 7 is a conceptual diagram illustrating an operation of the key-value manager 120, according to an embodiment. FIG. 7 illustrates an operation in which the key-value manager 120 generates the key stream ST_KEY and the value stream ST_VAL based on the key-value command CMD_KV.

Referring to FIGS. 2 and 7, the key-value manager 120 may receive key-value pairs KVP and separate the keys KEY from the values VALUE that are both included in the key-value pairs KVP. The key-value manager 120 may combine the index Idx corresponding to the value VALUE with the key KEY and store the key KEY combined with the index Idx in the data buffer 130. In addition, the key-value manager 120 may generate the key stream ST_KEY by merging the plurality of keys KEY each combined with the corresponding indices Idx for the corresponding values VALUE. The key-value manager 120 may store the generated key stream ST_KEY in the first area AR1 of the NVM 140.

In FIG. 7, one key stream ST_KEY is illustrated to correspond to one index Idx, but this is for convenience of description. The key stream ST_KEY according to an embodiment of the present disclosure may include a plurality of index-key pairs in which the indices Idx are one-to-one combined with corresponding keys KEY.

The key-value manager 120 may generate the key table KT by using a physical page number (PPN) in which the key stream ST_KEY is stored in the NVM 140. In other words, the key table KT may store the key stream ST_KEY, the physical address of the NVM 140 in which the key stream ST_KEY is stored, and the index Idx or indices Idx corresponding to the key stream ST_KEY. In an embodiment, the key table KT may further include a validity bit indicating whether the key stream ST_KEY is valid.

The key-value manager 120 may store values VALUE separated from the key-value pair KVP in the data buffer 130, generate the value stream ST_VAL by merging the plurality of values VALUE stored in the data buffer 130, and store the generated value stream ST_VAL in the NVM 140.

The key-value manager 120 may generate a value table VT by using the PPN in which the value stream ST_VAL is stored in the NVM 140. In other words, the value table VT may store the value stream ST_VAL and the physical address of the NVM 140 in which the value stream ST_VAL is stored. In an embodiment, the value table VT may further include the validity bit indicating whether the value VALUE is valid.

Figure 8:
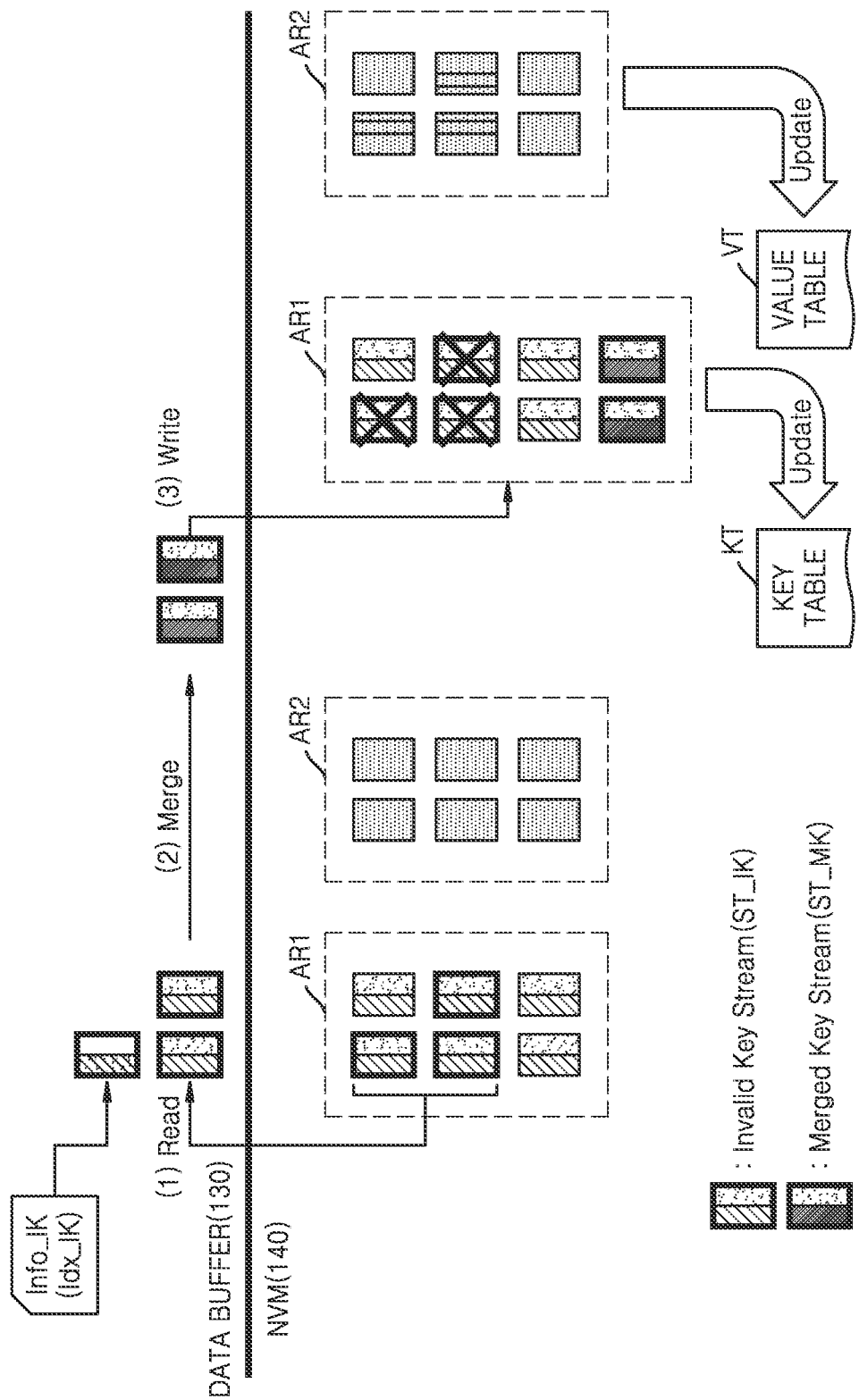
FIG. 8 is a conceptual diagram illustrating an operation of a key-value manager, according to an embodiment.

FIG. 8 is a conceptual diagram illustrating an operation of the key-value manager 120, according to an embodiment. FIG. 8 illustrates a diagram in which the key-value manager 120 performs the compaction operation.

Referring to FIGS. 3 and 8, the key-value manager 120 may perform an operation that includes reading an invalid key stream ST_IK from the first area AR1 of the NVM 140. The invalid key streams ST_IK may mean a key stream including an invalid key KEY. In an embodiment, the key-value manager 120 may receive the information about the invalid key Info_IK from the host (200 in FIG. 1). The key-value manager 120 may determine the invalid key stream ST_KEY based on the received information about the invalid Info_IK.

In an example, the information about the invalid key Info_IK may include the index information corresponding to the invalid key Idx_IK. The key-value manager 120 may determine the invalid key KEY from the key table KT by using the index information corresponding to the invalid key Idx_IK.

The key-value manager 120 may generate at least one merged key stream ST_MK by merging the read invalid key streams ST_IK. In an example, the key-value manager 120 may generate the merged key stream ST_MK by deleting the invalid key KEY based on the information about the invalid key Info_IK and extracting only valid keys. Accordingly, the merged key stream ST_MK may include the key stream ST_KEY including only valid keys KEY.

The key-value manager 120 may write the merged key stream ST_MK in the first area AR1 of the NVM 140. In addition, the key-value manager 120 may delete the invalid key stream ST_IK after writing the merged key stream ST_MK, and update the validity bit corresponding to the invalid key stream ST_IK to an updated validity bit in the key table KT.

The key-value manager 120 may update the value table VT by using invalid values VALUE corresponding to invalid keys KEY. In an embodiment, the key-value manager 120 may update the value table VT by converting the validity bits corresponding to the invalid values VALUE of the value table VT to updated validity bits showing that the corresponding values VALUE are invalid.

In an embodiment, the key-value manager 120 may perform a garbage collection operation for the invalid values VALUE based on the validity bits of the value table VT. As the garbage collection operation is performed based on the value table VT, the invalid values VALUE may be deleted from the second area AR2.

The key-value manager 120 according to an embodiment of the present disclosure may minimize an operation for determining the invalid key KEY by using information about the invalid key Info_IK received from the host when performing the compaction operation. Accordingly, a data input/output speed required for the compaction operation may be increased.

Figure 9:
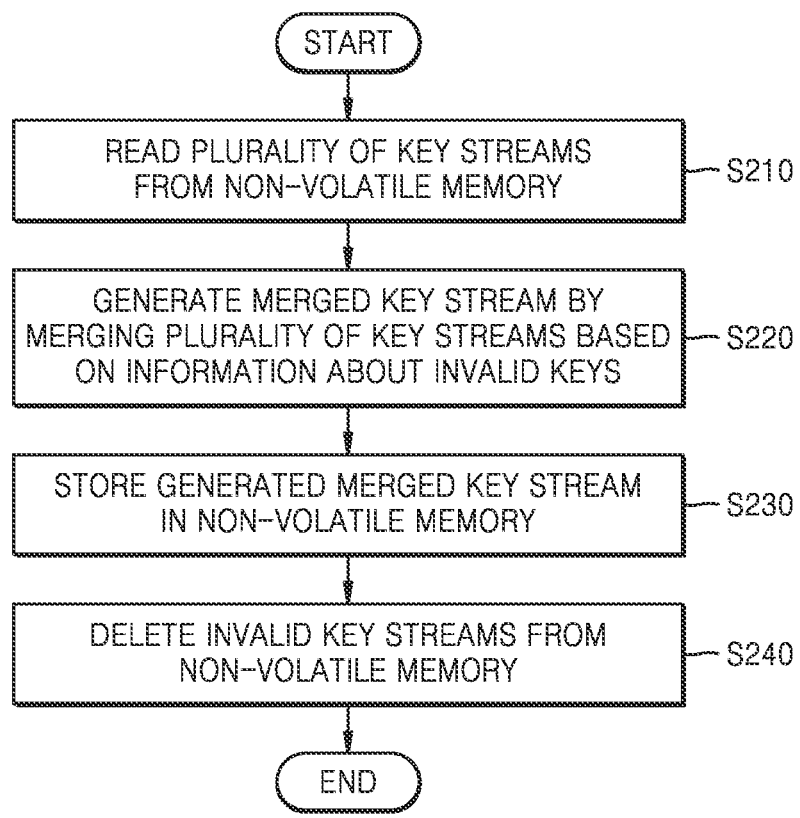
FIG. 9 is a flowchart for explaining an operation method of a key-value manager, according to an embodiment.

FIG. 9 is a flowchart for explaining an operation method of the key-value manager 120, according to an embodiment. FIG. 9 illustrates an operation method in which the key-value manager 120 performs the compaction operation.

Referring to FIGS. 3 and 9, the key-value manager 120 may read the plurality of key streams ST_KEY from the NVM 140 (S210). In an embodiment, the plurality of key streams ST_KEY that are read may include at least one invalid key KEY. The key-value manager 120 may generate a new key stream ST_KEY by merging the plurality of key streams ST_KEY based on the information about the invalid key Info_IK (S220). In an example, the key-value manager 120 may receive the index information corresponding to the invalid key Info_IK as the index information corresponding to the invalid key Idx_IK from the host 200. The key-value manager 120 may determine the invalid key KEY based on the index information corresponding to the invalid key Idx_IK. In addition, the key-value manager 120 may generate the merged key stream ST_MK by removing the invalid key KEY included in the plurality of key streams ST_KEY and merging only the valid keys KEY.

The key-value manager 120 may store the merged key stream ST_MK in the NVM 140 (S230). The key-value manager 120 may delete the invalid key streams ST_KEY from the NVM 140 (S240) after storing the merged key stream ST_MK. In an embodiment, the key-value manager 120 may update the key table KT such that the validity bit corresponding to the invalid key stream ST_IK indicates invalidity. In addition, the key-value manager 120 may update the value table VT by using the values VALUE corresponding to the invalid keys KEY.

Figures 10, 11:
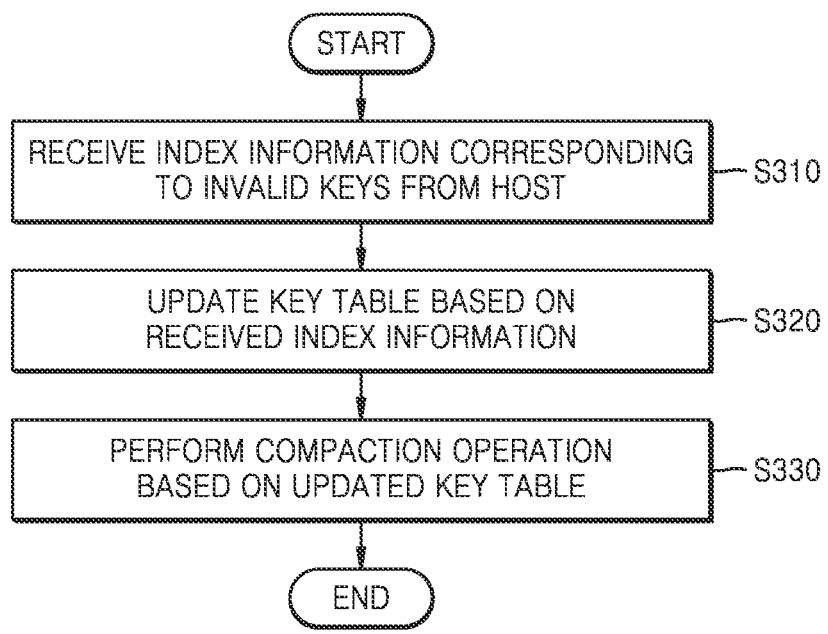
FIG. 10 is a diagram illustrating a key table according to an embodiment.
FIG. 11 is a flowchart for explaining an operation method of a key-value manager, according to an embodiment.

FIG. 10 is a diagram illustrating the key table KT according to an embodiment.

Referring to FIGS. 3 and 10, the key table KT may include the key KEY, the index Idx, a physical address ADDR (for example, PPN1, PPN2, PPN3, or PPN4) in which the key KEY is stored, and a validity bit Vld. In an example, a first key KEY1 may have '1' assigned thereto as the index Idx, and may be stored at a first physical address PPN1 of the NVM 140. In addition, when the value VALUE corresponding to the first key KEY1 is determined to be valid, the first key KEY1 may have '1' as the validity bit Vld.

A second key KEY2 may have '2' assigned thereto as the index Idx, and may be stored at a second physical address PPN2 of the NVM 140. In addition, when the value VALUE corresponding to the second key KEY2 is determined to be valid, the second key KEY2 may have '1' as the validity bit Vld.

A third key KEY3 may have '3' assigned thereto as the index Idx, and may be stored at a third physical address PPN3 of the NVM 140. In addition, when the value VALUE corresponding to the third key KEY3 is determined to be invalid, the third key KEY3 may have '0' as the validity bit Vld.

A fourth key KEY4 may have '4' assigned thereto as the index Idx, and may be stored at a fourth physical address PPN4 of the NVM 140. In addition, when the value VALUE corresponding to the fourth key KEY4 is determined to be valid, the fourth key KEY4 may have '1' as the validity bit Vld.

In an example, the key-value manager 120 may receive from the host 200 the compaction command CMP_CP along with "2" as the index information corresponding to the invalid key Idx_IK. The key-value manager 120 may update the validity bit Vld corresponding to the second key Key2 having '2' as the index Idx to '0'. The key-value manager 120 may perform the compaction operation for deleting the second key Key2 and the third KEY3.

FIG. 11 is a flowchart for explaining an operation method of the key-value manager 120, according to an embodiment.

Referring to FIGS. 3 and 11, the key-value manager 120 may receive the index information corresponding to the invalid keys Idx_IK from the host 200 (S310). The key-value manager 120 may update the key table KT based on the received index information corresponding to the invalid keys Idx_IK (S320). In an example, the key-value manager 120 may update the validity bit Vld corresponding to the invalid key KEY to an updated validity bit Vld to show that the key KEY is the invalid key KEY based on the index information corresponding to the invalid keys Idx_IK.

The key-value manager 120 may perform the compaction operation based on an updated key table KT_udt (S330). In an example, the key-value manager 120 may generate the merged key stream ST_MK by merging valid keys KEY and excluding invalid keys KEY based on the validity bits Vld included in the updated key table KT_udt. The key-value manager 120 may store the merged key stream ST_MK in the NVM 140.

Figures 12A, 12B:
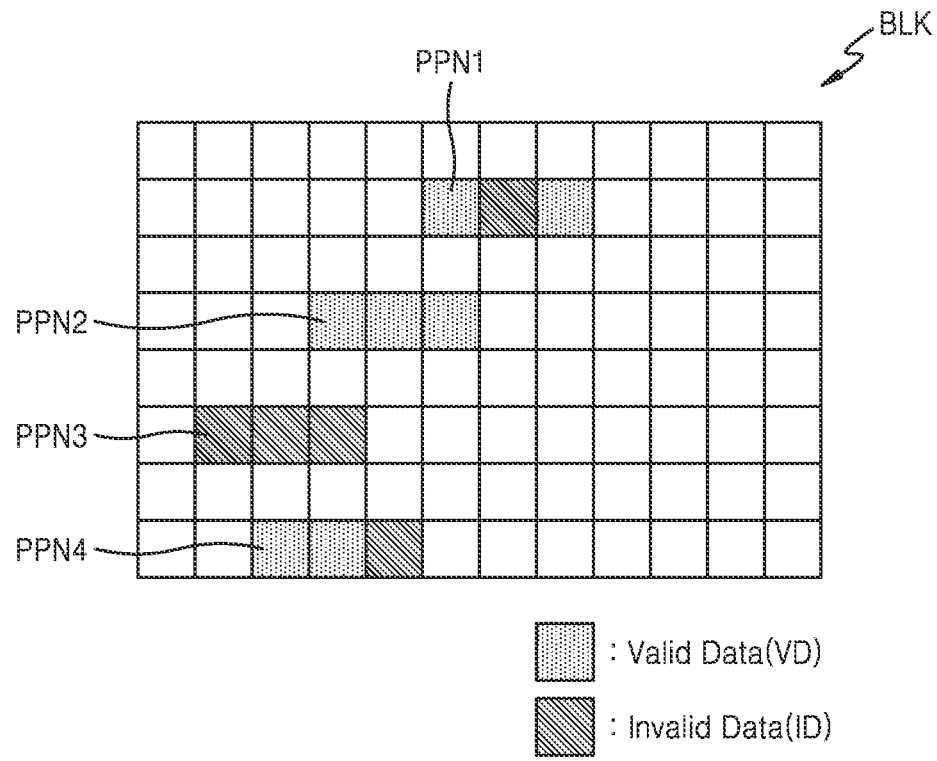
FIG. 12A is a diagram illustrating a block according to an embodiment.
FIG. 12B is a diagram illustrating a multi-tab table according to an embodiment.

FIG. 12A is a diagram illustrating a block BLK according to an embodiment. FIG. 12B is a diagram illustrating a multi-map table MMT according to an embodiment. In an example, the multi-map table MMT of FIG. 12B may represent the key table KT or the value table VT described above with reference to FIGS. 1 through 11.

Referring to FIG. 12A, the block BLK may include a plurality of memory cells (represented by squares in FIG. 12A) each having a different PPN. The plurality of memory cells may store valid data VD or invalid data ID. In an embodiment, the valid data VD or the invalid data ID may include the key KEY or the value VALUE described above with reference to FIGS. 1 through 11. In addition, the valid data VD may represent a value VALUE for which the delete command has not been received from the host (200 in FIG. 1) or a key KEY corresponding to the value VALUE for which the delete command has not been received. The invalid data ID may represent a value VALUE for which the delete command has been received from the host 200 or a key KEY corresponding to the value VALUE for which the delete command has been received.

The block BLK may store a plurality of pieces of data, and at least some of them may be continuously written. In the example of FIG. 12A, three pieces of data may be continuously written to the first physical address PPN1, three pieces of data may be continuously written to the second physical address PPN2, three pieces of data may be continuously written to the third physical address PPN3, and three pieces of data may be continuously written to the fourth physical address PPN4.

Referring to FIG. 12B, storage locations of the written pieces of data in FIG. 12A may be identified by using the multi-map table MMT. The multi-map table MMT may include an address ADDR (for example, physical address PPN) in which a first data among consecutive pieces of data is stored, and the first validity bit VD1, the second validity bit VD2 and the third validity bit VD3 indicating validity of the consecutive pieces of data stored in the address ADDR. In addition, the multi-map table MMT may include the index Idx corresponding to the written pieces of data. In an example, the first validity bit VD1, the second validity bit VD2 and the third validity bit VD3 may include '1's when data corresponding thereto is valid, and '0's when data corresponding thereto is invalid. In an embodiment, the key-value manager 120 may update the multi-map table MMT based on the information about the invalid key Info_IK received from the host 200.

Referring again to FIGS. 12A and 12B, because consecutive pieces of data stored in the first physical address PPN1 may include sequentially the valid data VD, the invalid data ID, and the valid data VD, the multi-map table MMT may include sequentially '1', '0', and '1' as the first validity bit VD1, the second validity bit VD2 and the third validity bit VD3 corresponding to the first physical address PPN1, respectively. Because consecutive pieces of data stored in the second physical address PPN2 are all valid data VD, the multi-map table MMT may include all '1's as the first validity bit VD1, the second validity bit VD2 and the third validity bit VD3 corresponding to the second physical address PPN2.

Because consecutive pieces of data stored in the third physical address PPN3 are all invalid data ID, the multi-map table MMT may include all '0's as the first validity bit VD1, the second validity bit VD2 and the third validity bit VD3 corresponding to the third physical address PPN3. Because consecutive pieces of data stored in the fourth physical address PPN4 may be sequentially the valid data VD, the valid data VD, and the invalid data ID, the multi-map table MMT may include sequentially '1', '1', and '0' as the first validity bit VD1, the second validity bit VD2 and the third validity bit VD3 corresponding to the fourth physical address PPN4.

In an embodiment, the key-value manager (120 in FIG. 2) may perform the compaction operation by using the multi-map table MMT. In an example, the key-value manager 120 may update the multi-map table MMT based on the index information received from the host 200. When one or more keys stored in the consecutive addresses ADDR are invalid, the key-value manager 120 may perform the compaction operation based on the updated multi-map table MMT. For example, when all keys stored in the consecutive addresses ADDR are invalid, the key-value manager 120 may perform the compaction operation based on the updated multi-map table MMT.

In an embodiment, the key-value manager (120 in FIG. 2) may perform the garbage collection operation by using the multi-map table MMT. In other words, the key-value manager 120 may determine which data (for example, the key stream ST_KEY or the value stream ST_VAL) is valid by using the multi-map table MMT. The key-value manager

120 may secure a valid space of the NVM (140 in FIG. 20) by performing the garbage collection operation on the valid data VD.

Figure 13:
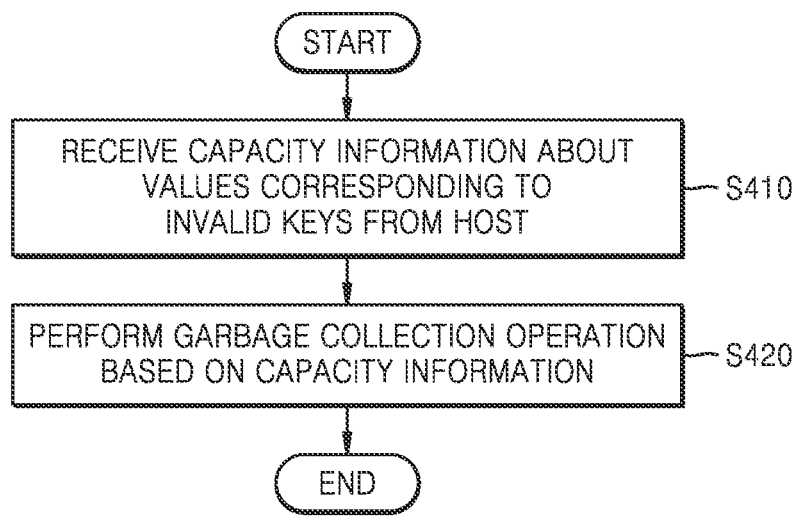
FIG. 13 is a flowchart illustrating an operating method of a storage device, according to an embodiment.

FIG. 13 is a flowchart illustrating an operating method of the storage device 100, according to an embodiment.

Referring to FIGS. 1 and 13, the storage device 100 may receive data capacity information about the values VALUE corresponding to invalid keys KEY from the host 200 (S410). In an example, the data capacity information about the value VALUE may correspond to a physical size that the value VALUE occupies in the NVM 140.

The storage device 100 may perform the garbage collection operation based on the received data capacity information (S420). The storage device 100 may perform the garbage collection operation for deleting the value VALUE based on the received data capacity information. The value VALUE that is deleted in the garbage collection operation corresponds to the key KEY that has been deleted in the compaction operation, and is deleted based on the received data capacity information.

Figure 14:
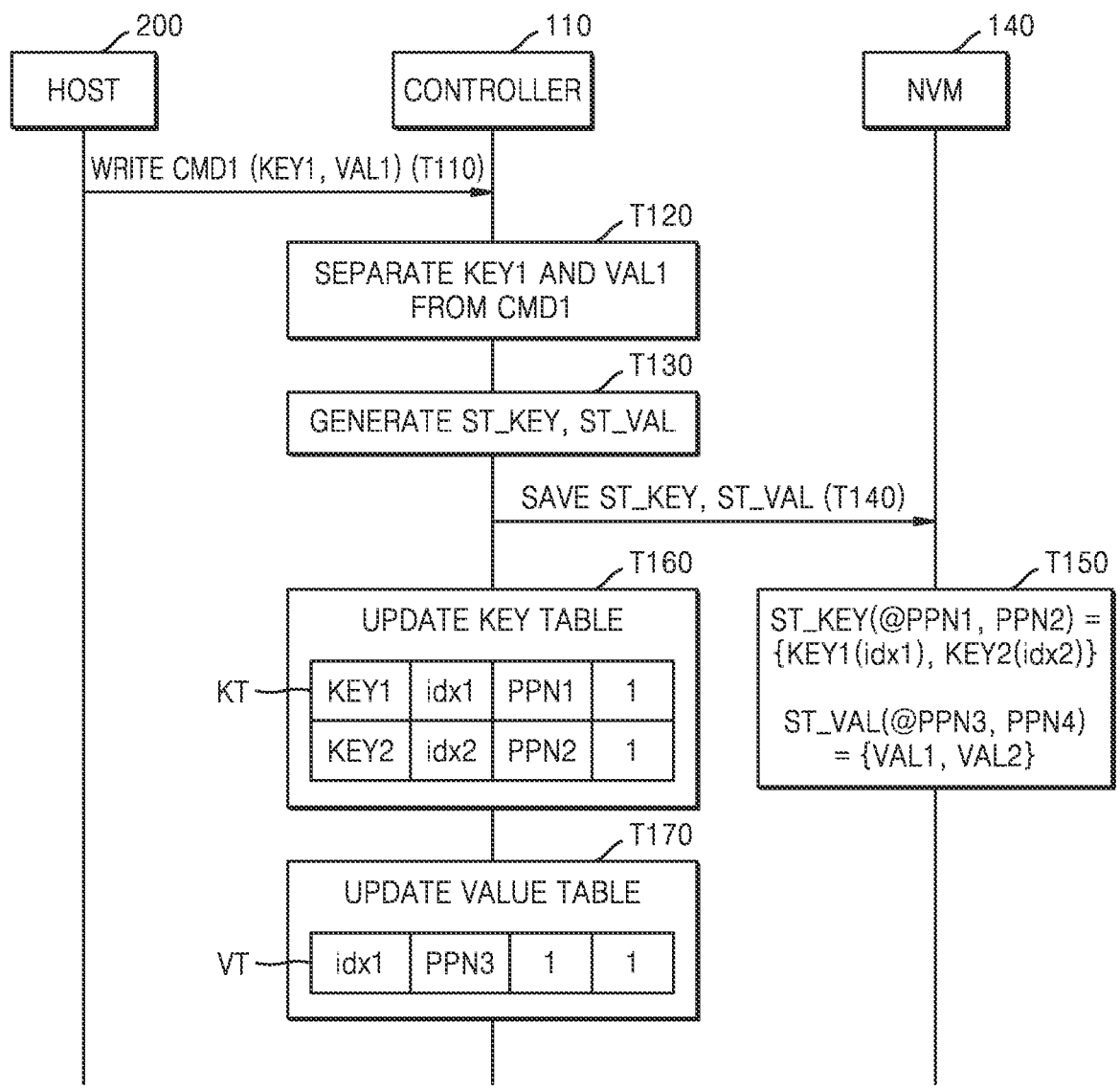
FIG. 14 is a diagram illustrating an operation of a storage system over time, according to an embodiment.

FIG. 14 is a diagram illustrating an operation of the storage system 10 over time, according to an embodiment. FIG. 14 illustrates a diagram of an embodiment in which the storage system 10 receives a write command.

Referring to FIG. 14, the storage system 10 may include the host 200, the controller 110, and the NVM 140. The host 200 may output a first command CMD1 for writing a first key KEY1 and a first value VAL1 to the controller 110 (T110). The controller 110 may separate the first key KEY1 from the first value VAL1 out of the first command CMD1 (T120).

The controller 110 may generate the key stream ST_KEY by using the first key KEY1 and a second key KEY2 that has been previously stored in the data buffer (130 in FIG. 2). The controller 110 may generate the value stream ST_VAL by using a first value VAL1 and a second value VAL2 that has been previously stored in the data buffer (130 in FIG. 1) (T130). In an embodiment, the controller 110 may generate the key stream ST_KEY. The controller 110 may generate the key stream ST_KEY first by combining a first index idx1 corresponding to the first value VAL1 with the first key KEY1 and a second index idx2 corresponding to the second value VAL2 with the second key KEY2. The controller 110 may generate the key stream ST_KEY next by combinations of the first key KEY1 and the first index Idx1 and of the second key KEY2 and the second index Idx2.

The controller 110 may store the generated key stream ST_KEY and value stream ST_VAL in the NVM 140 (T140). The NVM 140 may store the first key KEY1 at the first physical address PPN1 and the second key KEY2 at the second physical address PPN2 (T150). In addition, the NVM 140 may store the first value VAL1 at the third physical address PPN3 and the second value VAL2 at the fourth physical address PPN4 (T150). In an embodiment, the first physical address PPN1 and the second physical address PPN2 may be physically contiguous to each other, and the third physical address PPN3 and the fourth physical address PPN4 may be physically contiguous to each other. In addition, the first physical address PPN1 and the second physical address PPN2 may be located in a different area from the third physical address PPN3 and the fourth physical address PPN4.

The controller 110 may update the key table KT by allocating a storage location of the first key KEY1 to the first physical address PPN1 and a storage location of the second key KEY2 to the second physical address PPN2 in the key table KT (T160).

The controller 110 may write the third physical address PPN3 in the value table VT so that the third address PPN3 corresponds to the first index idx1 corresponding to the first value VAL1. In addition, because the first value VAL1 and the second value VAL2 written at consecutive addresses are valid, the controller 110 may update the value table VT by writing '1's as the validity bits to correspond thereto (T170).

Figure 15:
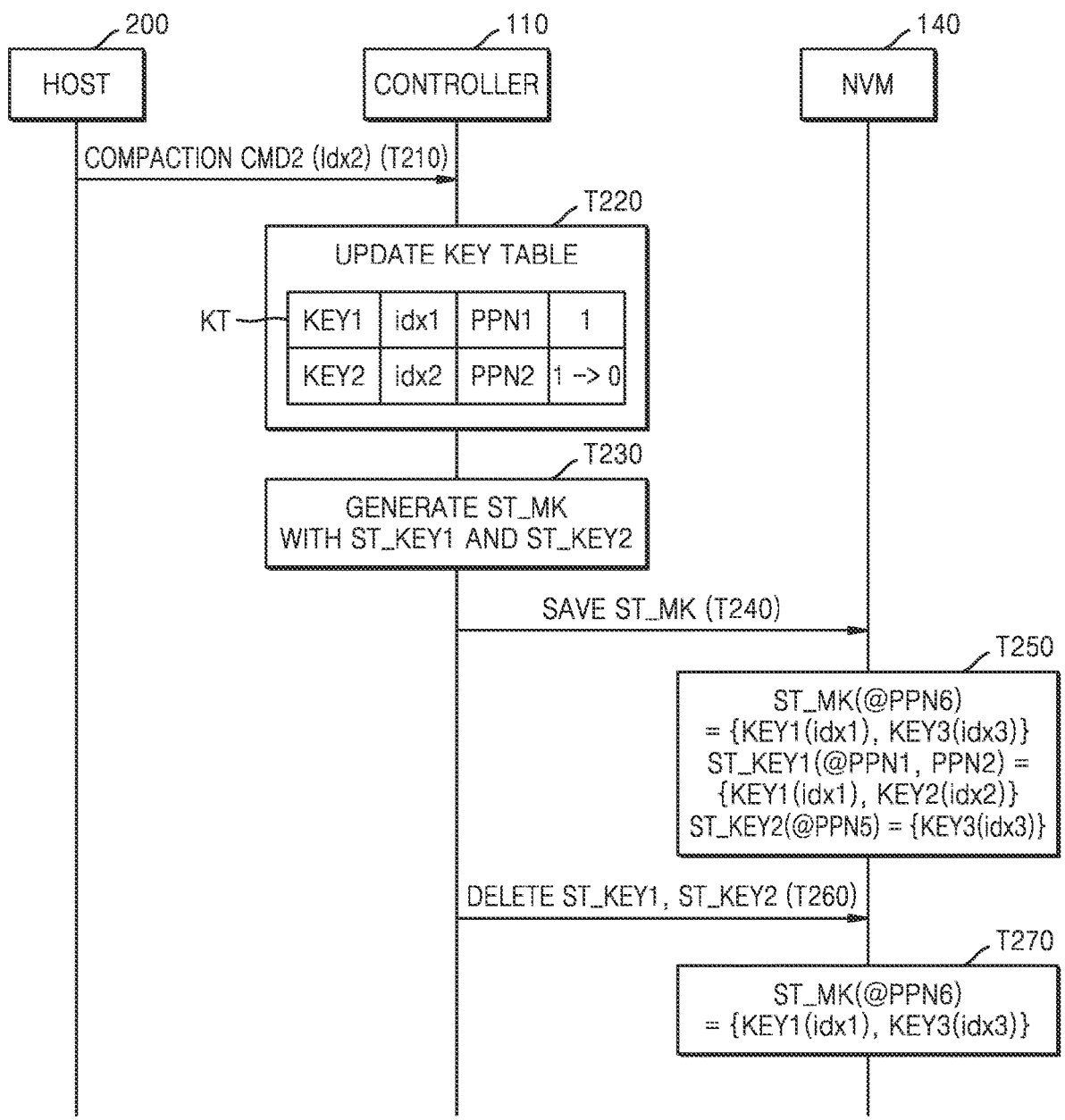
FIG. 15 is a diagram illustrating an operation of a storage system over time, according to an embodiment.

FIG. 15 is a diagram illustrating an operation of the storage system 10 over time, according to an embodiment. FIG. 15 illustrates a diagram of an embodiment in which the storage system 10 receives a compaction command.

Referring to FIG. 15, the storage system 10 may include the host 200, the controller 110, and the NVM 140. The host 200 may output to the controller 110 a second command CMD2 for the compaction operation on the second key KEY and the second value VAL2 (T210). In an embodiment, the host 200 may transmit to the controller 110 the second index Idx2 corresponding to the second key KEY2 together with the second command CMD2.

The controller 110 may update the validity bit corresponding to the second key KEY2 to an updated validity bit in the key table KT in response to the second command CMD2. The validity bit corresponding to the second key KEY2 may be updated to '0' to indicate that the second key KEY2 is invalid (T220). Although not illustrated, the controller 110 may also update a second validity bit of the value table VT to an updated second validity bit in response to the second command CMD2. The second validity bit may indicate whether the second value VAL2 is valid. In addition, although not illustrated, the controller 110 may read from the NVM 140 the first key stream ST_KEY1 and the second key stream ST_KEY2 that include the second key KEY2 corresponding to the second index Idx2 to perform the compaction operation.

The controller 110 may generate the merged key stream ST_MK by removing at least one key KEY including the invalid second key KEY2 from the first key stream ST_KEY1 and the second key stream ST_KEY2 based on the received second index Idx2, and merging valid keys KEY (T230). In an example, the controller 110 may generate the merged key stream ST_MK by deleting the second key KEY2 corresponding to the second command CMD2, and using at least the first key KEY1 included in the first key stream ST_KEY1 and the third key KEY3 included in the second key stream ST_KEY2.

The controller 110 may store the merged key stream ST_MK in the NVM 140 (T240), and the NVM 140 may store the merged key stream ST_MK at the sixth physical address PPN6 (T250). Next, the controller 110 may delete the first key stream ST_KEY1 and the second key stream ST_KEY2 stored in the NVM 140 (T260) after storing the merged key stream ST_MK. The NVM 140 may delete the first key stream ST_KEY1 and the second key stream ST_KEY2 by performing an erase operation at the first physical address PPN1 storing the first key stream ST_KEY1, at the second physical address PPN2 storing the second key stream ST_KEY2, and at the fifth physical address PPN5(T270).

Figure 16A:
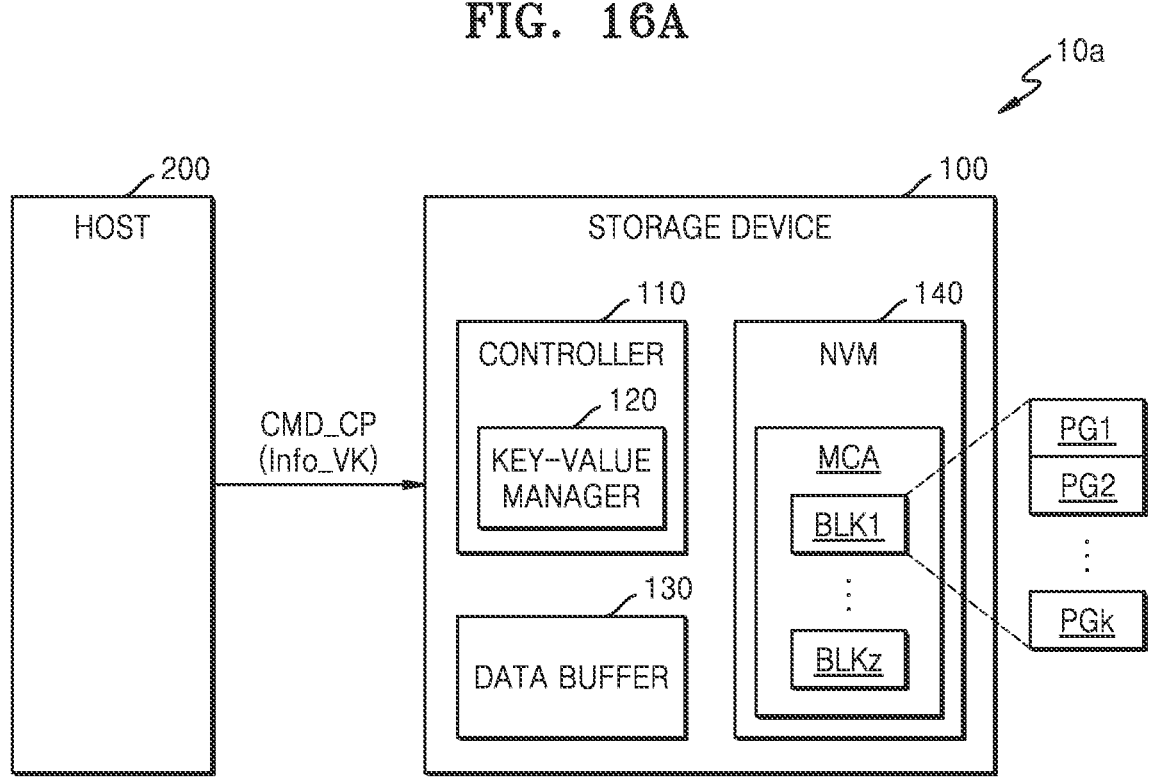
FIG. 16A is a block diagram illustrating a storage system according to an embodiment.

According to an aspect of inventive concept(s) described herein, the controller 110 may perform the compaction operation by using information about the second index Idx2 received from the host 200. Accordingly, it may not be necessary to input/output data into/from the data buffer (130 in FIG. 1) to determine valid keys KEY, and the compaction operation may be efficiently performed FIG. 16A is a block diagram illustrating a storage system according to an embodiment. FIG. 16A illustrates an embodiment of the storage device 100 that receives the information about the valid key Info_VK from the host 200. Descriptions previously given with reference to FIGS. 1 through 15 are omitted.

Referring to FIG. 16A, a storage system 10a may include the storage device 100 and the host 200, and the storage device 100 may include the controller 110, data buffer 130, and the NVM 140. The storage device 100 may receive the information about the valid key Info_VK together with the compaction command CMD_CP from the host 200, unlike the embodiments described above with reference to FIGS. 1 through 15.

In an embodiment of the present disclosure, the storage device 100 may perform the compaction operation that merges only valid keys KEY among the plurality of key streams ST_KEY based on the information about the valid keys Info_VK. In an example, the information about the valid keys Info_VK may include the index information about the valid key KEY and the address information about the valid key KEY.

Figure 16B:
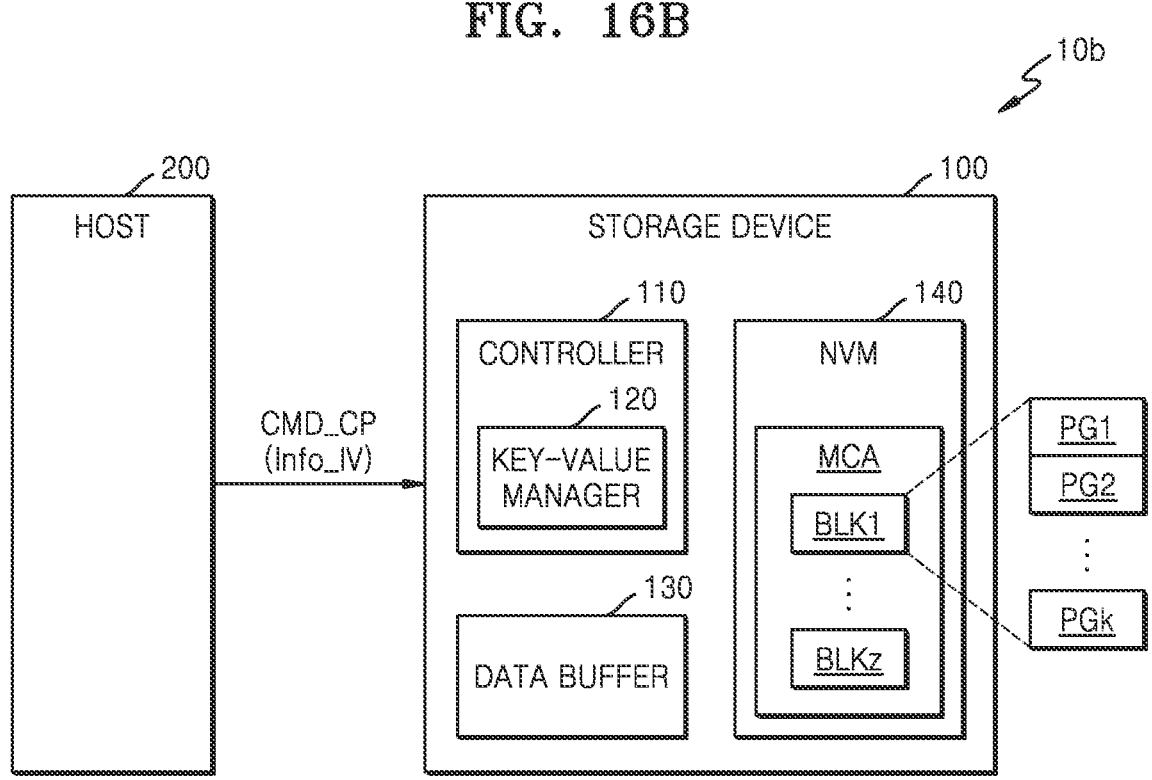
FIG. 16B is a block diagram illustrating a storage system according to an embodiment.

FIG. 16B is a block diagram illustrating a storage system 10b according to an embodiment. FIG. 16B illustrates an embodiment of the storage device 100 that receives information about the invalid value Info_IV from the host 200. Descriptions previously given with reference to FIGS. 1 through 15 are omitted.

Referring to FIG. 16B, a storage system 10b may include the storage device 100 and the host 200, and the storage device 100 may include the controller 110 and the NVM 140. The storage device 100 may receive the information about the invalid value Info_IV together with the compaction command CMD_CP from the host 200, unlike the embodiments described above with reference to FIGS. 1 through 15.

In an embodiment of the present disclosure, the storage device 100 may determine a key KEY, which is invalid based on the information about the invalid value Info_IV and at least one table stored in the data buffer 130. The storage device 100 may perform the compaction operation that merges only valid keys KEY among the plurality of key streams ST_KEY by using information about the determined invalid key. In an example, the information about the invalid value Info_IV may include the index information about the invalid value VALUE and the address information about the invalid value VALUE.

Figure 17:
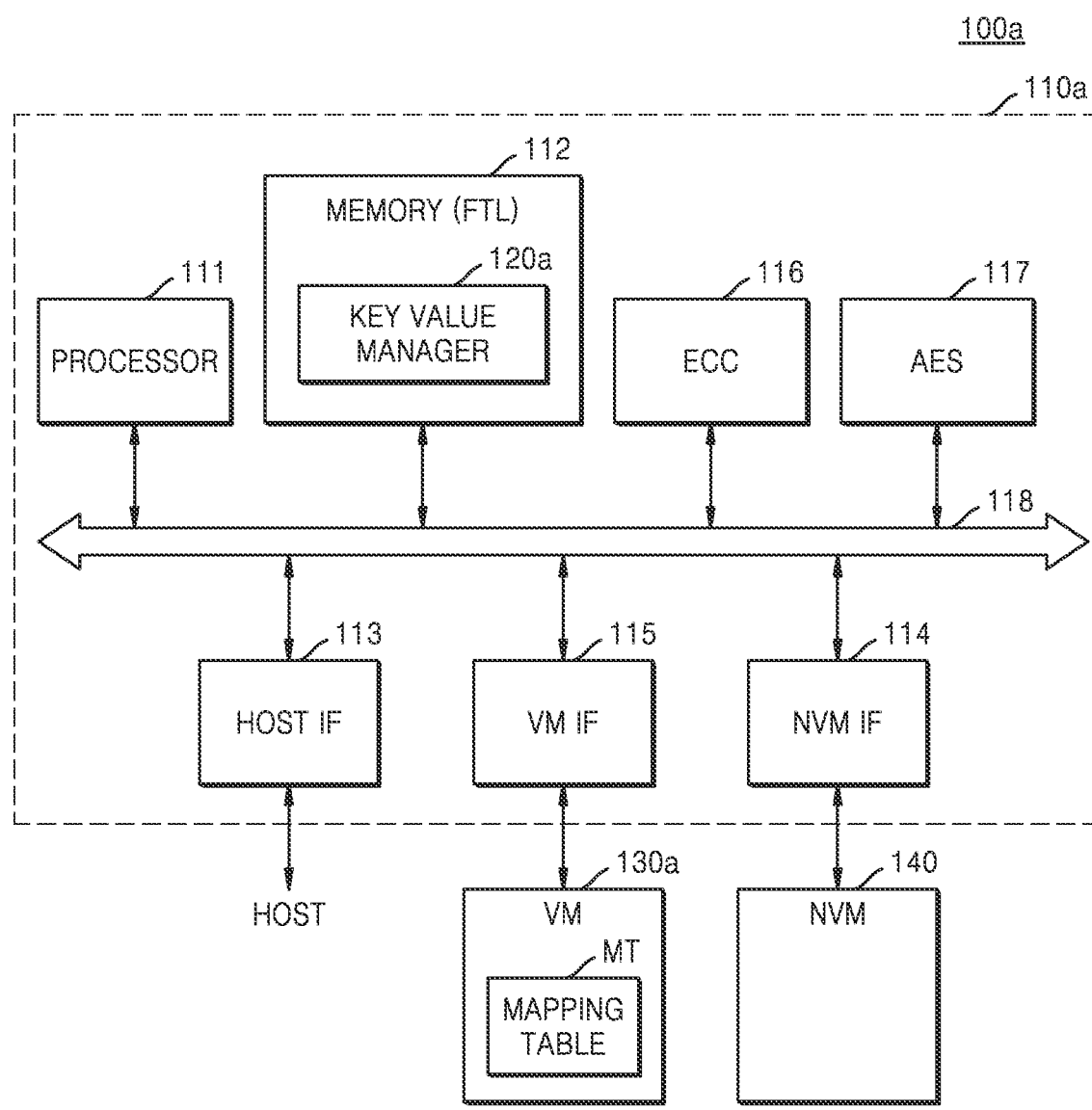
FIG. 17 is a block diagram illustrating a storage device according to an embodiment.

FIG. 17 is a block diagram illustrating a storage device 100a according to an embodiment.

Referring to FIG. 17, the storage device 100a may include a controller 110a, a VM 130a (volatile memory), and the NVM 140. In addition, the controller 110a may include a processor 111, a memory 112, a host interface (IF) 113, a NVM IF 114, a VM IF 115, ECC (error correction code) engine 116, and AES (advance encryption standard) engine 117, which are capable of communicating with each other via a bus 118.

The processor 111 may include a central processing unit (CPU), a microprocessor, or the like, and may control the overall operation of the controller 110a. The processor 111 may execute software instructions stored in and retrieved from the memory 112 and/or received from outside the controller 110a. The memory 112 may operate under a control of the processor 111, and may be used as an operation memory, a buffer memory, a cache memory, or the like. For example, the memory 112 may be implemented as a VM such as DRAM and SRAM, or an NVM such as PRAM and a flash memory.

The key-value manager 120a may be implemented with firmware or software. The key-value manager 120a may be loaded onto the memory 112. In an embodiment, the key-value manager 120a may be implemented with a flash translation layer (FTL) and may be loaded onto the memory 112. However, the present embodiment is not limited thereto, and the key-value manager 120a may be implemented with hardware. The operations described above with reference to FIGS. 1 through 16B may be performed by the processor 111 by using the key-value manager 120a.

The host IF 113 may provide the IF between the host 200 and the controller 110a according to, for example, universal serial bus (USB), multi-media card (MMC), peripheral component interconnect (PCI) express (PCI-E), advanced technology attachment (ATA), serial ATA (SATA), parallel ATA (PATA), small computer system interface (SCSI), serial attached SCSI (SAS), enhanced small disk interface (ESDI), integrated drive electronics (IDE), etc. In an embodiment of the present disclosure, the information about the invalid key Info_IK together with the compaction command CMD_CP may be provided to the key-value manager 120a via the host IF 113.

The NVM IF 114 may provide the IF between the controller 110a and the NVM 140. For example, the key stream ST_KEY or a value stream ST_VAL may be transceived between the controller 110a and the NVM 140 via the NVM IF 114. The NVM IF 114 may be implemented to comply with standard conventions such as Toggle or ONFI.

The VM IF 115 may provide the IF between the controller 110a and the VM 130a. For example, the key KEY, the value VALUE, and the mapping table MT may be transceived between the controller 110a and the VM 130a.

The VM 130a may store the mapping table MT. For example, the VM 130a may further store the keys KEY and the values VALUE, like the data buffer 130 in FIG. 2. To this end, the VM 130a may be implemented with DRAM. The mapping table MT may include any one of the multi-map table, the key table KT, and the value table VT described above with reference to FIGS. 1 through 16B.

The ECC engine 116 may perform an error detection and correction function for read data read from the nonvolatile memory 140. Specifically, the ECC engine 116 may generate parity bits for write data to be written to the nonvolatile memory 140, and the parity bits generated as described above are stored together with the write data. When reading data from the nonvolatile memory 140, the ECC engine 116 may correct the error of the read data using parity bits read from the nonvolatile memory 140 together with the read data, and output the read data in which error are corrected. In one embodiment, the ECC engine 116 may include an ECC encoder (not shown) that generates parity bits for write data and/or an ECC decoder (not shown) that corrects errors in read data.

The AES engine 117 may perform at least one of an encryption operation and a decryption operation for data input to the controller 110a. In an embodiment, the AES engine 117 may perform at least one of an encryption operation and a decryption operation using a symmetric-key algorithm. In one embodiment, the AES engine 117 may include an encryption module (not shown) that performs an encryption operation and/or a decryption module (not shown) that performs a decryption operation.

Each of the ECC engine 116 and the AES engine 117 may be implemented as firmware or software, and may be loaded into the memory 112. However, the present disclosure is not limited thereto, and each of the ECC engine 116 and the AES engine 117 may be implemented as hardware, or may be implemented as a combination of software and hardware.

According to an aspect of inventive concept(s) described herein, the key-value manager 120a may perform various operations (for example, the compaction operation and the garbage collection operation) on the key-value pair without intervention of the host 200 or an operating system (OS). Accordingly, a data processing speed may be increased.

Figure 18:
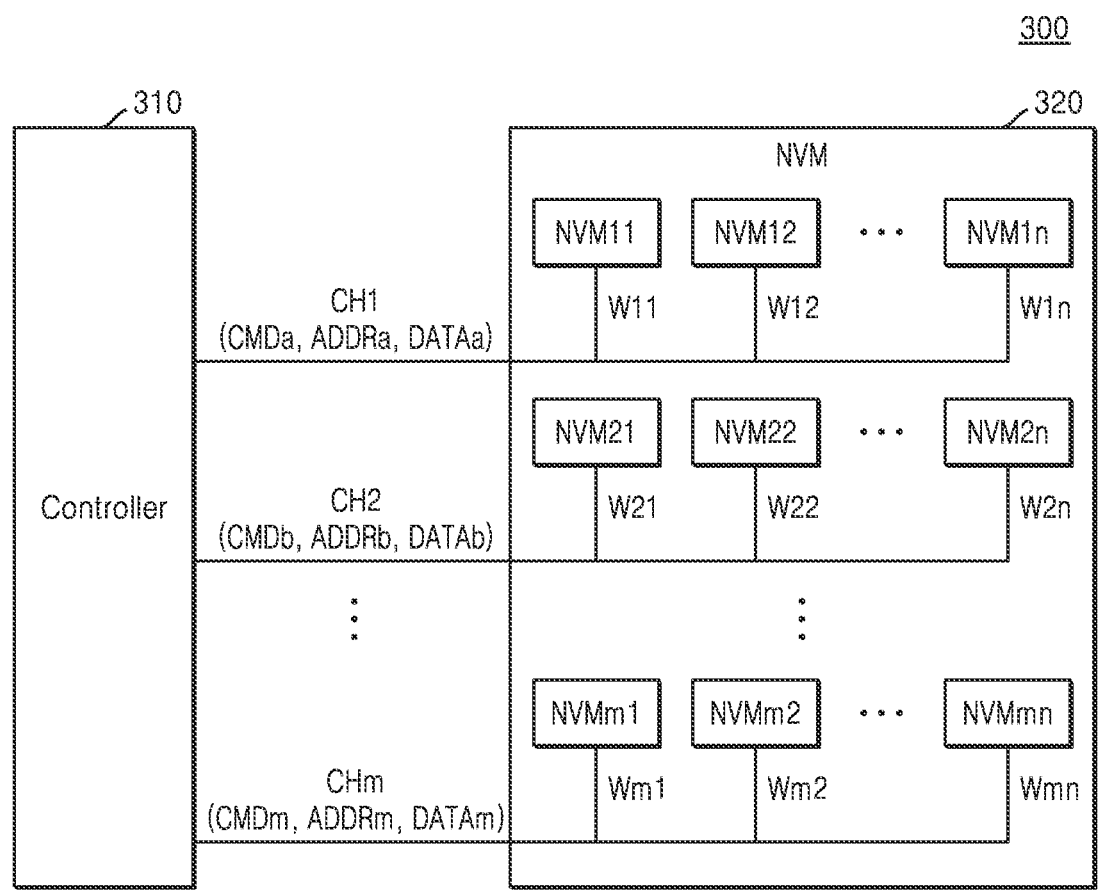
FIG. 18 is a block diagram illustrating a storage device according to an embodiment.

FIG. 18 is a block diagram illustrating a storage device according to an embodiment.

Referring to FIGS. 17 and 18, the storage device 300 may include a controller 310 and a nonvolatile memory 320. The storage device 300 may support a plurality of channels CH1 to CHm, and the controller 310 and the nonvolatile memory 320 may be connected through a plurality of channels CH1 to CHm. The controller 310 may correspond to the controllers 110 and 110a described above in FIGS. 1 to 17, and the nonvolatile memory 320 may correspond to the nonvolatile memory 140 described above in FIGS. 1 to 17.

The nonvolatile memory 320 may include a plurality of nonvolatile memory devices NVM11 to NVMmn. Each of the nonvolatile memory devices NVM11 to NVMmn may be connected to one of the plurality of channels CH1 to CHm through a corresponding way. For example, the nonvolatile memory devices NVM11 to NVM1n are connected to the first channel CH1 through the ways W11 to W1n, and the nonvolatile memory devices NVM21 to NVM2n are connected to the second channel CH2 through the ways W21 to W2n.

The controller 310 may transmit and receive signals to and from the nonvolatile memory 320 through a plurality of channels CH1 to CHm. For example, the controller 310 transmits commands CMDa to CMDm, addresses ADDRa to ADDRm, and data DATAa to DATAm to the nonvolatile memory 320 through channels CH1 to CHm. Alternatively, data DATAa to DATAm may be received from the nonvolatile memory 320.

The controller 310 may select one of the nonvolatile memory devices connected to the corresponding channel through each channel, and transmit and receive signals with the selected nonvolatile memory device. For example, the controller 310 may select the nonvolatile memory device NVM11 from among the nonvolatile memory devices NVM11 to NVM1n connected to the first channel CH1. The controller 310 transmits a command CMDa, an address ADDRa, and data DATAa to the selected nonvolatile memory device NVM11 through the way W11, or receive data DATAa from the selected nonvolatile memory device NVM11 through the way W11.

Figure 19:
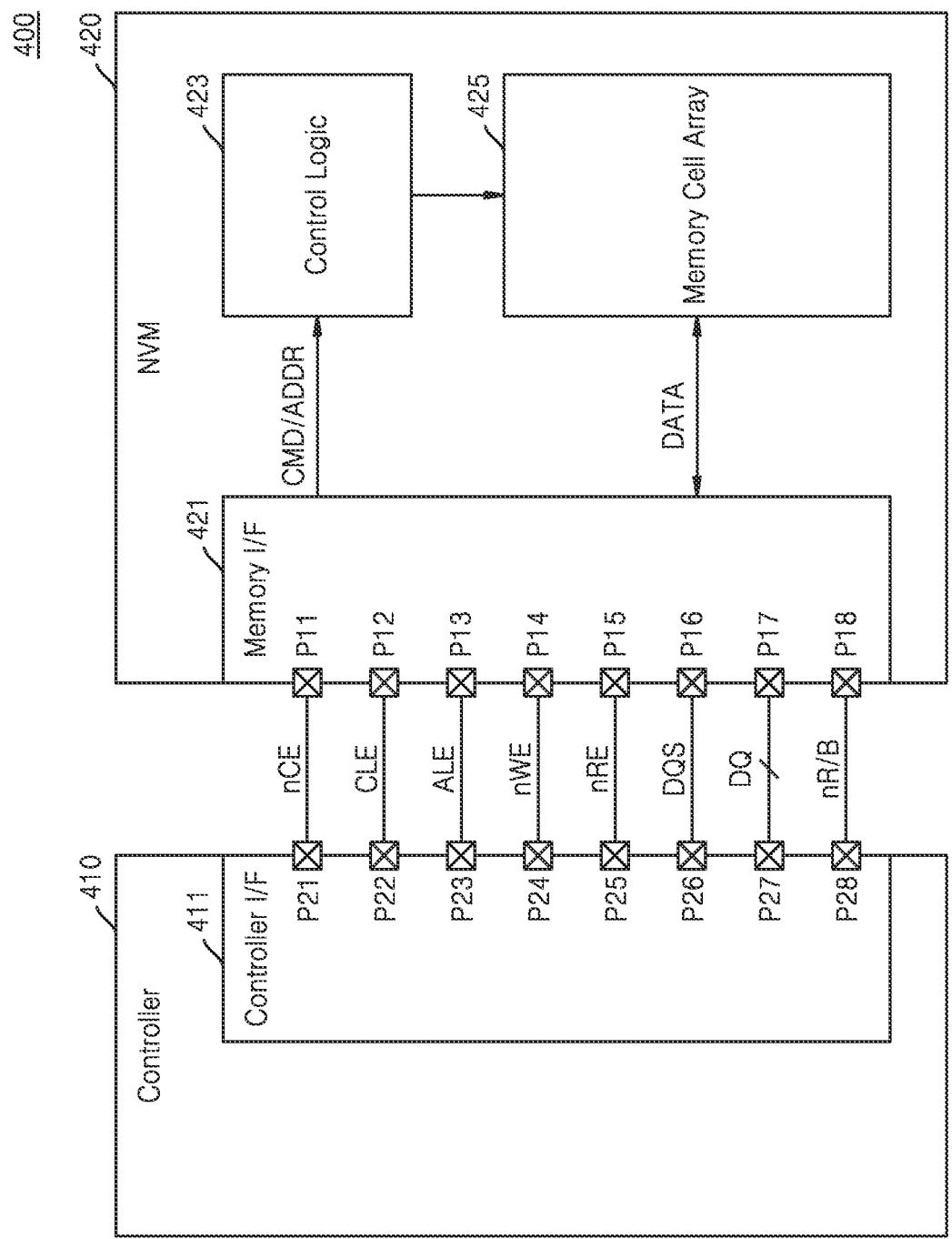
FIG. 19 is a block diagram illustrating a storage device according to an embodiment.

FIG. 19 is a block diagram illustrating a storage device according to an embodiment.

Referring to FIGS. 18 and 19, the storage device 400 may include a controller 410 and a nonvolatile memory 420. The nonvolatile memory 420 may correspond to one of the nonvolatile memory devices NVM11 to NVMmn communicating with the controller 310 based on one of the plurality of channels CH1 to CHm of FIG. 18. The controller 410 may correspond to the controller 310 of FIG. 18.

The controller 410 may include first to eighth pins P21 to P28 and a controller interface circuit 411. The nonvolatile memory 420 may include first to eighth pins P11 to P18, a memory interface circuit 421, a control logic circuit 423, and a memory cell array 425. The first to eighth pins P21 to P28 may correspond to the first to eighth pins P11 to P18.

The controller interface circuit 411 may transmit the chip enable signal nCE to the nonvolatile memory 420 through the first pin P21. The controller interface circuit 411 may transmit and receive signals to and from the nonvolatile memory 420 selected through the chip enable signal nCE through the second to eighth pins P22 to P28.

The controller interface circuit 411 transmits a command latch enable signal CLE, an address latch enable signal ALE, and a write enable signal nWE through the second to fourth pins P22 to P24 to a nonvolatile memory 420. The controller interface circuit 411 may transmit the read enable signal nRE to the nonvolatile memory 420 through the fifth pin P25. The controller interface circuit 411 may receive the data strobe signal DQS from the nonvolatile memory 420 through the sixth pin P26 or transmit the data strobe signal DQS to the nonvolatile memory 420 through the sixth pin P26.

The controller interface circuit 411 may transmit or receive the data signal DQ to and from the nonvolatile memory 420 through the seventh pin P27. The command CMD, the address ADDR, and the data DATA may be transmitted through the data signal DQ. For example, the data signal DQ may be transmitted through a plurality of data signal lines. In this case, the seventh pin P17 may include a plurality of pins corresponding to a plurality of data signals. The memory interface circuit 421 may transmit the ready/busy output signal nR/B to the controller 410 through the eighth pin P28.

The control logic circuit 423 may generally control various operations of the nonvolatile memory 420. The control logic circuit 423 may receive the command/address CMD/ADDR obtained from the memory interface circuit 421. The control logic circuit 421 may generate various control signals for programming data DATA into the memory cell array 425 or reading data DATA from the memory cell array 425 according to the received command/address CMD/ADDR.

Figure 20:
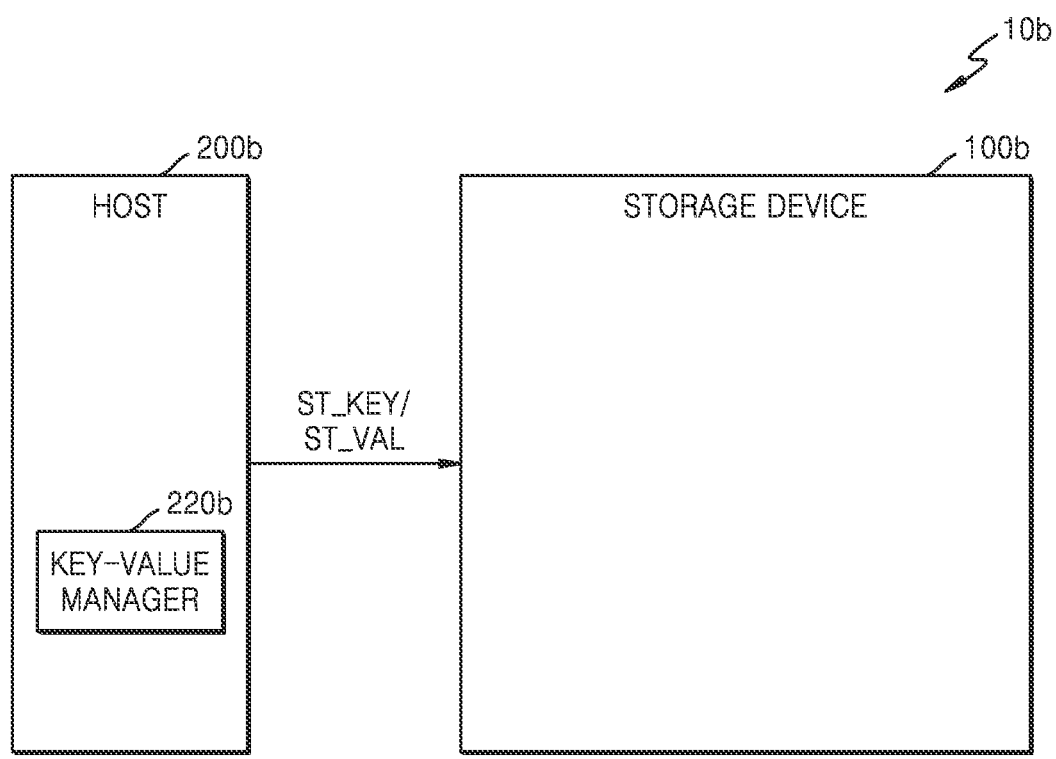
FIG. 20 is a block diagram illustrating a storage system according to an embodiment.

FIG. 20 is a block diagram illustrating a storage system 10b according to another embodiment. Descriptions previously given with reference to FIG. 1 are omitted.

Referring to FIG. 20, the storage system 10b may include a storage device 100b and a host 200b, and the host 200b may include a key-value manager 220b. The key-value manager 220b may perform the operations described above with reference to FIGS. 1 through 17. For example, the storage system 10b may be configured as an open channel SSD in which the host 200b directly controls the storage device 100b without a separate controller.

The key-value manager 220b may read the plurality of key streams ST_KEY from the storage device 100b, delete invalid keys KEY from the plurality of key streams ST_KEY, and perform the compaction operation for generating a new key stream ST_KEY by using valid keys KEY. According to an embodiment, the key-value manager 220b may store the information about the invalid key Info_IK, determine which key KEY is valid among the plurality of key streams ST_KEY based on the stored information, and generate a new key stream ST_KEY by merging only valid keys KEY among the plurality of key streams ST_KEY.

Figure 21:
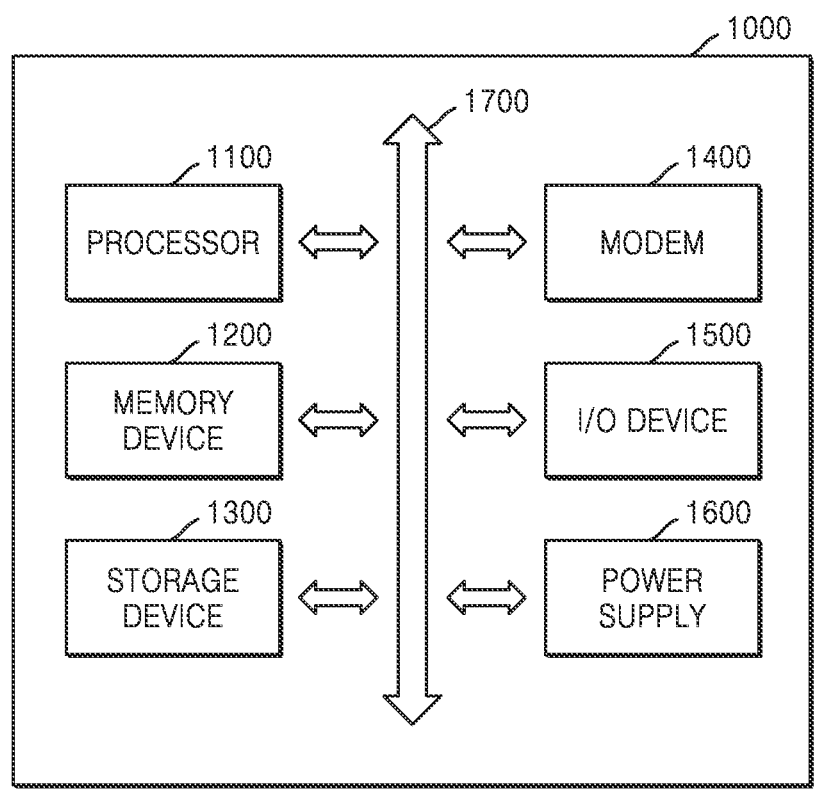
FIG. 21 is a block diagram illustrating an electronic device according to an embodiment.

FIG. 21 is a block diagram illustrating an electronic device 1000 according to an embodiment.

Referring to FIG. 21, the electronic device 1000 may include a processor 1100, a memory device 1200, a storage device 1300, a modem 1400, an input/output (I/O) device 1500, and a power supply 1600. In an embodiment, the storage device 1300 may be implemented by using the embodiments described above with reference to FIGS. 1 through 20.

In an embodiment, the storage device 1300 may determine the invalid key KEY by using the information about the invalid key Info_IK received from the host (for example, the processor 1100) in the compaction operation. The storage device 1300 may perform the compaction operation for generating the merged key stream ST_MK by merging the key stream ST_KEY including the invalid key KEY with the key stream ST_KEY different therefrom. Accordingly, the amount of access data of a VM device in the compaction process of the storage device 1300 may be reduced, and the data processing speed may be increased.

Figure 22:
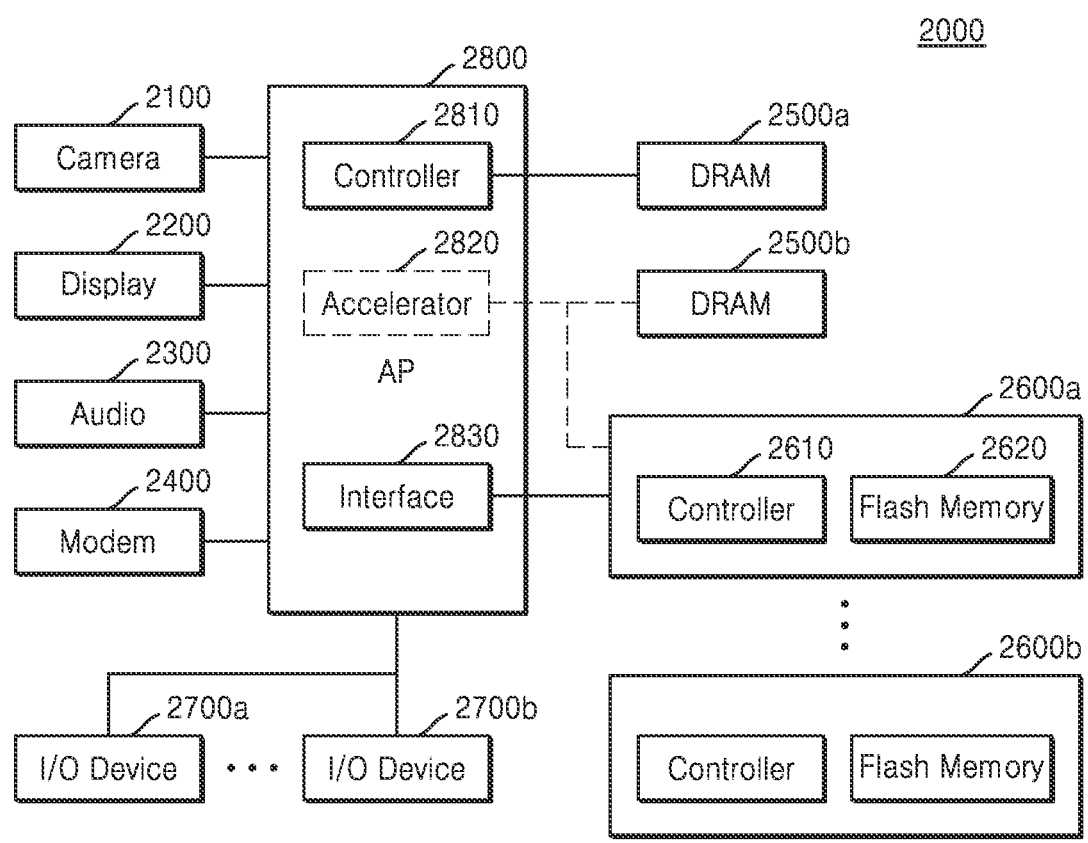
FIG. 22 is a diagram illustrating a mobile system to which a memory device is applied, according to an embodiment.

FIG. 22 is a diagram illustrating a mobile system 2000 to which a memory device is applied, according to an embodiment.

Referring to FIG. 22, the mobile system 2000 may include a camera 2100, a display 2200, an audio processing unit 2300, a modem 2400, DRAMs (2500*a* and 2500*b*), flash memory devices (2600*a* and 2600*b*), I/O devices (2700*a* and 2700*b*), and an AP 2800.

The mobile system 2000 may be implemented with a laptop computer, a mobile phone, a smart phone, a tablet personal computer (PC), a wearable device, a health care device, or an Internet-of-Things (IoT) device. In addition, the mobile system 2000 may be implemented with a server or a personal computer.

The camera 2100 may capture a still image or a video image according to a user's control. The mobile system 2000 may obtain particular information by using the still image/video image captured by the camera 2100. Alternatively, the mobile system 2000 may convert and store the still image/video image into other types of data such as a text. Alternatively, the mobile system 2000 may recognize a character string included in the still image/video image captured by the camera 2100 and provide a text or audio translation corresponding to the character string. In this manner, the field of use of the camera 2100 in the mobile system 2000 has been increasingly diversified. In an embodiment, the camera 2100 may transmit data such as the still image/video image to the AP 2800 according to a D-Phy or C-Phy interface according to the mobile industry processor interface (MIPI) standard.

The display 2200 may be implemented in various types such as a liquid crystal display (LCD), an organic light emitting diode (OLED) display, an active-matrix organic light-emitting diode (AM-OLED) display, a plasma display panel (PDP), a field emission display (FED), and an electronic paper display. In an embodiment, the display 2200 may also be used as an input device of the mobile system 2000 by providing a touch screen function. In addition, the display 2200 may be provided integrally with a fingerprint sensor or the like. The display 2200 may provide a security function of the mobile system 2000. In an embodiment, the AP 2800 may transmit image data to be displayed on the display 2200 to the display 2200 according to the D-Phy or C-Phy interface according to the MIPI standard.

The audio processing unit 2300 may process audio data stored in the flash memory device (2600*a* or 2600*b*) or audio data included in content received externally via the modem 2400 or the I/O device (2700*a* or 2700*b*). For example, the audio processing unit 2300 may perform various processes such as coding/decoding, amplification, noise filtering, and the like of the audio data.

The modem 2400 may modulate and transmit signals to transceive wired/wireless data, while an original signal received from the outside may be modulated and restored. The I/O devices (2700*a* and 2700*b*) may be devices that provide digital input and output. The I/O devices (2700*a* and 2700*b*) may include a port connectable to an external recording medium, an input device such as a touch screen or a mechanical button key, an output device capable of outputting vibration in a haptic method or the like, or the like. In some examples, the I/O devices (2700*a* and 2700*b*) may be connected to external recording media via ports such as a USB, a lightning cable, an SD card, a micro SD card, a DVD, and a network adapter.

The AP 2800 may control the overall operation of the mobile system 2000. The AP 2800 may control the display 2200 such that a portion of contents stored in the flash memory devices (2600*a* and 2600*b*) is displayed on a screen. In addition, when a user input is received via the I/O devices (2700*a* and 2700*b*), the AP 2800 may perform a control operation corresponding to the user input.

The AP 2800 may be provided as a system-on-chip (SoC) driving an application program, an operating system (OS), or the like. In addition, the AP 2800 may be included in one semiconductor package together with other devices included in the mobile system 2000, for example, the DRAM 2500*a*, a flash memory 2620, and/or a memory controller 2610. For example, the AP 2800 and at least one other device may be provided in a package form such as a package on package (PoP), ball grid arrays (BGAs), chip scale packages (CSPs), a system in package (SIP), a multi-chip package (MCP), a wafer-level fabricated package (WFP), and a wafer-level processed stack package (WSP). The kernel of an operating system running on the AP 2800 may include an I/O scheduler and a device driver for controlling the flash memory devices (2600*a* and 2600*b*). The device driver may control access performance of the flash memory devices (2600*a* and 2600*b*) by referring to the number of synchronous queues managed by the I/O scheduler, or may control a CPU mode inside the SoC, a dynamic voltage and frequency scaling (DVFS) level, etc.

In an embodiment, the AP 2800 may include a processor block for performing a computation operation or driving an application program and/or operation system, and other various peripheral components connected thereto via the processor block and a system bus. The peripheral components may include a memory controller, an internal memory, a power management block, an error detection block, a monitoring block, etc. The processor block may include one or more cores, and when a plurality of cores are included in the processor block, each of the plurality of cores may include a cache memory, and a common cache shared by the plurality of cores may be included in the processor block.

In an embodiment, the AP 2800 may include an accelerator block 2820 that is a dedicated circuit for an artificial intelligence (AI) data computation. Alternatively, according to embodiments, a separate accelerator chip may be provided separately from the AP 2800, and DRAM 2500*b* may be additionally connected to the accelerator block 2820 or the accelerator chip. The accelerator block 2820 may be a function block that professionally performs particular functions of the AP 2800, and may include a graphics processing unit (GPU) for professionally performing graphic data processing, a neural processing unit (NPU) for professionally performing the AI data computation and inference, a data processing unit (DPU) dedicated for data transmission, etc.

According to an embodiment, the mobile system 2000 may include a plurality of DRAMs (2500*a* and 2500*b*). In an embodiment, the AP 2800 may include a controller 2810 for controlling the DRAMs (2500*a* and 2500*b*), and the DRAM 2500*a* may be directly connected to the AP 2800.

The AP 2800 may control DRAM by setting commands and a mode register set (MRS) conforming to the Joint Electron Device Engineering Council (JEDEC) standard. Alternatively, the AP 2800 may communicate by setting specifications and functions required by the mobile system 2000 such as a low voltage, a high speed, and reliability and DRAM interface protocol for cyclic redundancy check/error checking and correcting (CRC/ECC). For example, the AP 2800 may communicate with the DRAM 2500a via an interface conforming to the JEDEC standard such as low power double data rate (LPDDR) 4 (LPDDR4) and LPDDR5. Alternatively, the AP 2800 may communicate by setting a new DRAM interface protocol so that the DRAM 2500b for the accelerator, which has a higher bandwidth than the DRAM 2500a, is controlled by the accelerator block 2820 or the accelerator chip separately provided from the AP 2800.

Although only DRAMs (2500a and 2500b) are illustrated in FIG. 22, the configuration of the mobile system 2000 is not necessarily limited thereto, and other memories except the DRAMs (2500a and 2500b) may be included in the mobile system 2000 according to bandwidth, response speed, voltage condition, etc. of the AP 2800 or the accelerator block 2820. For example, the controller 2810 and/or the accelerator block 2820 may control various memories such as PRAM, SRAM, MRAM, RRAM, FRAM, and hybrid RAM. The DRAMs (2500a and 2500b) may have a relatively small latency and high bandwidth than the I/O devices (2700a and 2700b) or the flash memory devices (2600a and 2600b). The DRAMs (2500a and 2500b) may be initialized at the power-on time point of the mobile system 2000, and when the operating system and application data are loaded, may be used as a temporary storage place for the operating system and application data or as an execution space for various software codes.

In the DRAMs (2500a and 2500b), data of addition/subtraction/multiplication/division arithmetic operations and vector operations, address operations, or fast Fourier transformation (FFT) operations may be stored. In another embodiment, the DRAMs (2500a and 2500b) may be provided as a processing in memory (PIM) equipped with a calculation function. For example, in the DRAMs (2500a and 2500b), a function for performance to be used in an inference operation may be performed. In this case, the inference operation may be performed by using a deep learning algorithm using an artificial neural network. The deep learning algorithm may include a training operation of learning a model using various data and the inference operation of recognizing data using the learned model. For example, the function used for the inference operation may include a hyperbolic tangent function, a sigmoid function, a rectified linear unit (ReLU) function.

In an embodiment, the image captured by the user by using the camera 2100 may be signal-processed and stored in the DRAM 2500b. The accelerator block 2820 or the accelerator chip may perform the AI data computation that recognizes data by using data stored in the DRAM 2500b and the function used in the inference operation.

According to an embodiment, the mobile system 2000 may include a plurality of storages or a plurality of flash memory devices (2600a and 2600b) having a larger data capacity (data storage capacity) than the DRAMs (2500a and 2500b).

The flash memory devices (2600a and 2600b) may include the memory controller 2610 and the flash memory 2620. The memory controller 2610 may receive control commands, data, and the like from the AP 2800, write data to the flash memory 2620 in response to the control command, or read data stored in the flash memory 2620 and transmit the read data to the AP 2800.

The flash memory devices (2600a and 2600b) may include memory devices according to various embodiments of the present disclosure described above with reference to FIGS. 1 through 20. When performing a read operation and/or a program verification operation, the flash memory devices (2600a and 2600b) may delay a time point at which a read pass voltage is input to at least one of a plurality of unselected word lines to a time point after a set-up period of the unselected word lines. As a result, the flash memory devices (2600a and 2600b) may prevent an occurrence of soft erase and secure reliability by controlling the degree to which the channel of the unselected cell strings is boosted to a certain voltage level such as a predetermined minimum voltage level. In addition, the flash memory devices (2600a and 2600b) may reduce consumed electricity and a size increase of a power supply device by selectively applying a pre-pulse voltage to any one of unselected string selection lines and unselected ground selection lines connected to unselected cell strings during a read operation and/or a program verification operation.

According to an embodiment, the accelerator block 2820 or the accelerator chip may perform the training operation and the AI data computation by using the flash memory devices (2600a and 2600b). In an embodiment, a block capable of executing a certain operation may be implemented inside the flash memory devices (2600a and 2600b), and the corresponding block may perform instead at least a portion of the training operation and an inference AI data computation that are performed by the AP 2800 and/or the accelerator block 2820 by using the data stored in the flash memory 2620.

In an embodiment, the AP 2800 may include an interface 2830, and accordingly, the flash memory devices (2600a and 2600b) may be directly connected to the AP 2800. For example, the AP 2800 may be implemented as an SoC, the flash memory device 2600a may be implemented as a separate chip from the AP 2800, and the AP 2800 and the flash memory device 2600a may be implemented in one package. However, embodiments of the present disclosure are not limited thereto, and the plurality of flash memory devices (2600a and 2600b) may be electrically connected to the mobile system 2000 via a connection.

The flash memory devices (2600a and 2600b) may store data such as still images and videos captured by the camera 2100, or store data received via a communication network and/or ports or the like included in the I/O devices (2700a and 2700b). For example, The flash memory devices (2600a and 2600b) may store augmented reality (AR)/virtual reality (VR), high definition (HD) or ultra high definition (UHD) content.

In an embodiment, the flash memory devices (2600a and 2600b) may be implemented by using embodiments described above with reference to FIGS. 1 through 20. In an embodiment, the flash memory devices (2600a and 2600b) may determine the invalid key KEY by using the information about the invalid key Info_IK received from the host 200 in the compaction operation. The flash memory devices (2600a and 2600b) may perform the compaction operation for generating the merged key stream ST_MK by merging the key stream ST_KEY including the invalid key KEY with the key stream ST_KEY different therefrom. Accordingly, the amount of access data of the VM device in the compaction process of the flash memory devices (2600a and 2600b) may be reduced, and the data processing speed may be increased.

Figure 23:
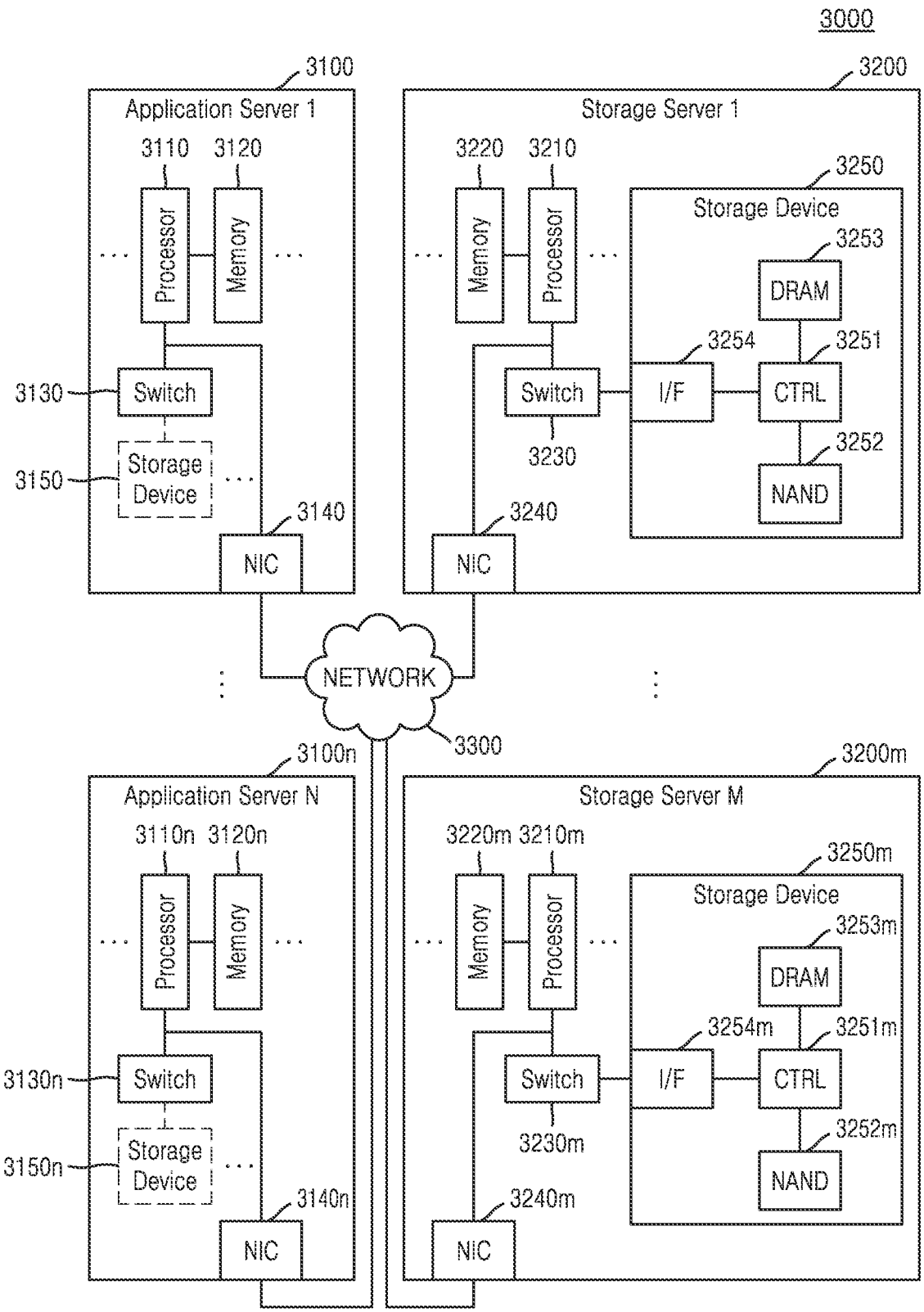
FIG. 23 is a diagram illustrating a mobile center to which memory devices are applied, according to an embodiment.

FIG. 23 is a diagram illustrating a data center 3000 to which memory devices are applied, according to an embodiment.

Referring to FIG. 23, the data center 3000 may be a facility where various data is collected and services are provided and may also be referred to as a data storage center. The data center 3000 may include application servers (3100 through 3100n) and storage servers (3200 through 3200m). The number of application servers (3100 through 3100n) and the number of storage servers (3200 through 3200m) may be variously selected according to embodiments, and the number of application servers (3100 through 3100n) and the number of storage servers (3200 through 3200m) may be different from each other.

The application server 3100 and the storage server 3200 may include at least one of processors (3110 and 3210) and memories (3120 and 3220), respectively. Referring to the storage server 3200 as an example, the processor 3210 may control the overall operation of the storage server 3200, access the memory 3220, and perform commands and/or data loaded in the memory 3220. According to an embodiment, the number of processors 3210 and the number of memories 3220 included in the storage server 3200 may be variously selected. In an embodiment, the processor 3210 and the memory 3220 may provide a processor-memory pair. In an embodiment, the number of processors 3210 and the number of memories 3220 may be different from each other. The processor 3210 may include a single-core processor or a multi-core processor. The above-description of the storage server 3200 may be similarly applied to the application server 3100. According to an embodiment, the application server 3100 may not include a storage device 3150. The storage server 3200 may include at least one of the storage devices 3250. The number of storage devices 3250 included in the storage server 3200 may be variously selected according to embodiments.

The application servers (3100 through 3100n) and the storage servers (3200 through 3200m) may communicate with each other via a network 3300. The network 3300 may be implemented by using fibre channel (FC) or Ethernet. In this case, the FC may be a medium used for relatively high speed data transmission and may use an optical switch providing high performance/high availability. According to an access method of the network 3300, the storage servers (3200 through 3200m) may be provided as file storages, block storages, or object storages.

Hereinafter, the application server 3100 and the storage server 3200 are mainly described. Descriptions of the application server 3100 may be applied to other application servers (for example, 3100n), and descriptions of the storage server 3200 may be applied to other storage servers (for example, 3200m).

The application server 3101 may store data requested by the user or client to be stored in one of the storage servers (3200 through 3200m) via the network 3300. Further, the application server 3100 may obtain data requested by the user or client to be read from one of the storage servers (3200 through 3200m) via the network 3300. For example, the application server 3100 may be implemented as a web server or a database management system (DBMS).

The application server 31001 may access a memory 3120n or a storage device 3150n included in an application server 3100n via the network 3300, or may access the memories (3220 through 3220m) or the storage devices (3250 through 3250m) included in the storage servers (3200 through 3200m) via the network 3300. Thus, the application server 3100 may perform various operations on data stored in the application servers (3100 through 3100n) and/or the storage servers (3200 through 3200m). For example, the application server 3100 may execute a command for moving or copying data between the application servers (3100 through 3100n) and/or the storage servers (3200 through 3200m). In this case, the data may be moved from the storage devices (3250 through 3250m) of the storage servers (3200 through 3200m), via the memories (3220 through 3220m) of the storage servers (3200 through 3200m), or directly, to the memories (3120 through 3120n) of the application servers (3100 through 3100n).

Referring to the storage server 3200 as an example, an I/F 3254 may provide a physical connection between the processor 3210 and a controller 3251 and a physical connection between a network interface controller (NIC) 3240 and the controller 32511. For example, the I/F 3254 may be implemented in a direct attached storage (DAS) method of directly connecting the storage device 3250 to a dedicated cable. In addition, for example, the I/F 32541 may be implemented in various interface methods such as advanced technology attachment (ATA), serial ATA (SATA), external SATA (e-SATA), small computer system interface (SCSI), serial attached SCSI (SAS), peripheral component interconnect (PCI), PCI express (PCIe), node version manager (NVM) express (NVMe), IEEE 1394, universal serial bus (USB), a secure digital (SD) card, a multi-media card (MMC), an embedded multi-media card (eMMC), universal flash storage (UFS), and a compact flash (CF) card.

The storage server 3200 may further include a switch 3230 and the NIC 3240. The switch 3230 may selectively connect the processor 3210 to the storage device 3250 under the control of the processor 3210. Alternatively, the switch 3230 may selectively connect the NIC 3240 to the storage device 3250.

In an embodiment, the NIC 3240 may include a network interface card, a network adapter, and the like. The NIC 3240 may be connected to the network 3300 by a wired interface, a wireless interface, a Bluetooth interface, an optical interface, and the like. The NIC 3240 may include an internal memory, a digital signal processor (DSP), a host bus interface, and the like, and may be connected to the processor 3210 and/or the switch 3230 via the host bus interface. The host bus interface may be implemented as one of the examples of the I/F 3254 described above. In an embodiment, the NIC 3240 may be integrated with at least one of the processor 3210, the switch 3230, and the storage device 3250.

In the storage servers (3200 through 3200m) or the application servers (3100 through 3100n), the processors (3110 through 31110n and 3210 through 3210m) may program or read data by transmitting commands to the storage devices (3130 through 3130n and 3250 through 3250m) or the memories (3120 through 3120n and 3220 through 3220n). In this case, the data may be an error-corrected data processed by an error checking and correcting (ECC) engine. The data may be data processed by data bus inversion (DBI) or data masking (DM), and may include cyclic redundancy code (CRC) information.

The storage devices (3150 through 3150m and 3250 through 3250m) may transmit control signals and command/address signals to NAND flash memory devices (3252 through 3252m) in response to read commands received from the processors (3110 through 3110n and 3210 through 3210m). Accordingly, when data is read from the NAND flash memory devices (3252 through 3252m), a read enable (RE) signal may be input as a data output control signal and may output the data to the data signal (DQ) bus. A data strobe (DQS) may be generated by using the RE signal. The command and address signals may be latched in a page buffer according to a rising edge or falling edge of a write enable (WE) signal.

In an embodiment, the storage devices (3150 through 3150*m*) may be implemented by using the embodiments described above with reference to FIGS. 1 through 20. In an embodiment, the storage devices (3150 through 3150*m*) may determine the invalid key KEY by using the information about the invalid key Info_IK received from the host 200 in the compaction operation. The storage devices (3150 through 3150*m*) may perform the compaction operation for generating the merged key stream ST_MK by merging the key stream ST_KEY including the invalid key KEY with the key stream ST_KEY different therefrom. Accordingly, the amount of access data of the VM device in the compaction process of the storage devices (3150 through 3150*m*) may be reduced, and the data processing speed may be increased.

The controller 3251 may control the overall operation of the storage device 3250. In an embodiment, the controller 3251 may include SRAM. The controller 3251 may write data to the NAND flash memory device 3252 in response to a write command. Alternatively, the controller 3251 may read data from the NAND flash memory device 3252 in response to a read command. For example, the write command and/or read command may be provided by the processor 3210 in the storage server 3200, the processor 3210*m* in another storage server 3200*m*, or the processors (3110 through 3110*n*) in the application servers (3100 through 3100*n*).

While the inventive concepts described herein have been particularly shown and described with reference to embodiments of the present disclosure, it will be understood that various changes in form and details may be made therein without departing from the spirit and scope of the following claims.

What is claimed is:

1. A storage device comprising:
   a nonvolatile memory;
   a volatile memory configured to store a plurality of keys including a first key and a second key and a plurality of values including a first value and a second value; and
   a controller coupled to the nonvolatile memory and the volatile memory, configured to receive a first command including a first key-value pair that includes the first key and the first value corresponding to the first key, and to receive a second command including a second key-value pair that includes the second key and the second value corresponding to the second key,
   wherein the controller is configured to separate the first key and the first value and to store the first key and the first value in the volatile memory, and to separate the second key and the second value and to store the second key and the second value in the volatile memory,
   the controller is configured to write the first value in the nonvolatile memory based on the first command, and to write the second value in the nonvolatile memory based on the second command, and
   the controller is configured to delete one or more invalid keys among the plurality of keys.

2. The storage device of claim 1, wherein the controller generates a first key stream using only valid keys among the plurality of keys.

3. The storage device of claim 2, wherein the controller stores the first key stream in a first region of the nonvolatile memory.

4. The storage device of claim 3, wherein the controller reads a plurality of key streams including the first key stream stored in the nonvolatile memory, deletes invalid keys among the plurality of key streams, and generates a third key stream using only valid keys among the plurality of key streams.

5. The storage device of claim 1, wherein the controller performs a garbage collection operation for invalid values corresponding to the one or more invalid keys.

6. The storage device of claim 5, wherein the controller generates a first value stream using only valid values among the plurality of values.

7. The storage device of claim 6, wherein the controller stores the first value stream in a second region of the nonvolatile memory.

8. The storage device of claim 1, wherein the storage device is a universal flash storage (UFS) memory device.

9. A storage device comprising:
   a nonvolatile memory;
   a volatile memory configured to store a plurality of keys including a first key and a second key and a plurality of values including a first value and a second value; and
   a controller coupled to the nonvolatile memory and the volatile memory, configured to receive a plurality of commands including a first command that includes a first key-value pair and a second command that includes a second key-value pair,
   wherein the first key-value pair includes the first key and the first value corresponding to the first key,
   the second key-value pair includes the second key and the second value corresponding to the second key,
   the controller is configured to separate the first key and the first value, to separate the second key and the second value, and to store the first key, the second key, the first value and the second value in the volatile memory,
   the controller is configured to write the first value in the nonvolatile memory based on the first command, and write the second value in the nonvolatile memory based on the second command,
   the controller is configured to delete one or more invalid keys among the plurality of keys, and
   the controller is configured to generate a first key stream using only valid keys among the plurality of keys.

10. The storage device of claim 9, wherein the controller stores the first key stream in a first region of the nonvolatile memory.

11. The storage device of claim 10, wherein the controller reads a plurality of key streams including the first key stream stored in the nonvolatile memory, deletes invalid keys among the plurality of key streams, and generates a third key stream using only valid keys among the plurality of key streams.

12. The storage device of claim 9, wherein the controller performs a garbage collection operation for invalid values corresponding to the one or more invalid keys.

13. The storage device of claim 9, wherein the controller generates a first value stream using only valid values among the plurality of values.

14. The storage device of claim 13, wherein the controller stores the first value stream in a second region of the nonvolatile memory.

15. The storage device of claim 9, wherein the storage device is an embedded universal flash storage (UFS) memory device.

16. A storage device comprising:
   a nonvolatile memory;
   a volatile memory configured to store a plurality of keys including a first key and a second key and a plurality of values including a first value and a second value; and a controller coupled to the nonvolatile memory and the volatile memory, configured to receive a plurality of commands including a first command that includes the first key and the first value corresponding to the first key and a second command that includes the second key and the second value corresponding to the second key, wherein the controller is configured to separate the first key and the first value, to separate the second key and the second value, and to store the first key, the second key, the first value and the second value in the volatile memory, the controller is configured to write the first value in the nonvolatile memory based on the first command, and write the second value in the nonvolatile memory based on the second command, the controller is configured to delete one or more invalid keys among the plurality of keys, and the controller is configured to perform a garbage collection operation for invalid values corresponding to the one or more invalid keys.

17. The storage device of claim 16, wherein the controller generates a first key stream using only valid keys among the plurality of keys.

18. The storage device of claim 17, wherein the controller stores the first key stream in a first region of the nonvolatile memory, the controller generates a first value stream using only valid values among the plurality of values, and the controller stores the first value stream in a second region of the nonvolatile memory.

19. The storage device of claim 16, wherein the volatile memory stores a physical address of the nonvolatile memory in which a key stream is stored.

20. The storage device of claim 16, wherein the storage device is an embedded universal flash storage (UFS) memory device.

* * * * *